(12) United States Patent
Nakayama

(10) Patent No.: US 8,873,161 B2
(45) Date of Patent: Oct. 28, 2014

(54) ZOOM LENS, CAMERA APPARATUS, INFORMATION DEVICE AND MOBILE INFORMATION TERMINAL APPARATUS

(75) Inventor: Takahiro Nakayama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 342 days.

(21) Appl. No.: 12/968,993

(22) Filed: Dec. 15, 2010

(65) Prior Publication Data

US 2011/0141578 A1 Jun. 16, 2011

(30) Foreign Application Priority Data

Dec. 15, 2009 (JP) .................................. 2009-284551
Mar. 15, 2010 (JP) .................................. 2010-058463

(51) Int. Cl.
*G02B 15/16* (2006.01)
*G02B 15/173* (2006.01)
*G02B 27/00* (2006.01)

(52) U.S. Cl.
CPC .......... *G02B 15/173* (2013.01); *G02B 27/0062* (2013.01)
USPC ........................................................ 359/687

(58) Field of Classification Search
USPC ........................................................ 359/687
See application file for complete search history.

(56) References Cited

U.S. PATENT DOCUMENTS

| | | |
|---|---|---|
| 3,836,375 A | 9/1974 | Broemer et al. |
| 4,990,468 A | 2/1991 | Komiya et al. |
| 6,404,561 B1 | 6/2002 | Isono et al. |
| 6,931,207 B2 | 8/2005 | Nanba |
| 7,450,316 B2 | 11/2008 | Morooka |

(Continued)

FOREIGN PATENT DOCUMENTS

| | | |
|---|---|---|
| CN | 1825154 A | 8/2006 |
| EP | 0 364 150 A1 | 4/1990 |

(Continued)

OTHER PUBLICATIONS

Ohara Inc. : Optical Glass DATA. Ohara Inc. : Optical Glass DATA. N.p., n.d. Web. Feb. 25, 2013. <http://www.ohara-inc.co.jp/en/product/optical/list/index.html>.*

(Continued)

*Primary Examiner* — Zachary Wilkes
(74) *Attorney, Agent, or Firm* — Oblon, Spivak, McClelland, Maier & Neustadt, L.L.P.

(57) ABSTRACT

A zoom lens includes a first lens group having a positive refractive power, a second lens group having a negative refractive power, an aperture stop, a third lens group having a positive refractive power, and a fourth lens group having a positive refractive power, which are disposed in order from an object side. The first lens group has a negative lens and a positive lens having a convex surface at an object side, which are disposed in order from the object side. An interval between the first lens group and the second lens group is increased and an interval between the second lens group and the third lens group is decreased when changing a magnification of the zoom lens from a wide angle end to a telephoto end. The first lens group and the third lens group are moved from positions at the wide angle end toward positions, which are at object sides thereof, at the telephoto end, respectively. Parameters are set so as to successfully correct chromatic aberration while achieving compact size, wide half field angle at the wide angle end, good performance, and a high magnification ratio.

10 Claims, 26 Drawing Sheets

(56) References Cited

U.S. PATENT DOCUMENTS

| | | | |
|---|---|---|---|
| 7,477,457 | B2 | 1/2009 | Satori |
| 7,535,654 | B2 * | 5/2009 | Ohashi ............... 359/690 |
| 7,545,580 | B2 | 6/2009 | Saruwatari |
| 7,777,951 | B2 | 8/2010 | Saruwatari |
| 8,238,039 | B2 * | 8/2012 | Yamagami ............ 359/687 |
| 2005/0270661 | A1 | 12/2005 | Nanba et al. |
| 2006/0193062 | A1 | 8/2006 | Ohashi |
| 2008/0100923 | A1 | 5/2008 | Morooka |
| 2008/0112061 | A1 | 5/2008 | Miyajima |
| 2008/0204892 | A1 * | 8/2008 | Satori et al. .......... 359/676 |
| 2009/0103187 | A1 * | 4/2009 | Watanebe et al. ..... 359/687 |
| 2009/0109546 | A1 | 4/2009 | Watanabe et al. |
| 2009/0190234 | A1 * | 7/2009 | Sato .................. 359/687 |
| 2010/0027254 | A1 | 2/2010 | Nakayama |
| 2010/0296180 | A1 | 11/2010 | Sudoh et al. |
| 2011/0116174 | A1 * | 5/2011 | Suzuki et al. ......... 359/687 |

FOREIGN PATENT DOCUMENTS

| | | | |
|---|---|---|---|
| JP | 8-248317 | 9/1996 | |
| JP | 2002-006217 | 1/2002 | |
| JP | 3391342 | 1/2003 | |
| JP | 2006-171055 | 6/2006 | |
| JP | 2006-309111 | 11/2006 | |
| JP | 2008-26837 | 2/2008 | |
| JP | 2008-102165 | 5/2008 | |
| JP | 2008-107559 | 5/2008 | |
| JP | 2008-112013 | 5/2008 | |
| JP | 2008-129222 | 6/2008 | |
| JP | 2008-145501 | 6/2008 | |
| JP | 2008-185782 | 8/2008 | |
| JP | 2008-203453 | 9/2008 | |
| JP | 2009-163068 | 7/2009 | |
| JP | 4405747 | 11/2009 | |
| JP | 2010-44343 | 2/2010 | |
| WO | WO 2009139253 A1 * | 11/2009 | ............ G03B 5/00 |
| WO | WO 2010004806 * | 1/2010 | |

OTHER PUBLICATIONS

HOYA Optical Glass. HOYA Optical Glass. N.p., n.d. Web. Feb. 27, 2013. <http://www.hoya-opticalworld.com/japanese/products/all_products.html>.*
Sumita Optical Glass—Optical Glass. Sumita Optical Glass—Optical Glass. N.p., n.d. Web. Feb. 27, 2013. <http://www.sumita-opt.co.jp/en/optical.htm>.*
Geary, Joseph M. Introduction to Lens Design: With Practical ZEMAX Examples. Richmond, VA: Willmann-Bell, 2002. p. 23. Print.*
"HOYA". N.p., n.d. Web. Jul. 31, 2013. <http://www.hoya-opticalworld.com/japanese/products/all_products.html> MPCD51.*
Ohara Inc. : Optical Glass DATA. Ohara Inc. : Optical Glass Data. N.p., n.d. Web. Jul. 30, 2013. <http://www.ohara-inc.co.jp/en/product/optical/list/index.html> SLAH71.*
Ohara Inc. : Optical Glass DATA. Ohara Inc. : Optical Glass DATA. N.p., n.d. Web. Jul. 30, 2013. <http://www.ohara-inc.co.jp/en/product/optical/list/index.html> STIH53.*
"HOYA". N.p., n.d. Web. Jul. 31, 2013. <http://www.hoya-opticalworld.com/japanese/products/all_products.html> MPCD4.*
"HOYA." HOYA. N.p., n.d. Web. Mar. 20, 2014. <http://www.hoya-opticalworld.com/japanese/products/all_products.html>.*
U.S. Appl. No. 12/861,343, filed Aug. 23, 2010, Takahiro Nakayama, et al.
Extended Search Report issued Jun. 8, 2011 in Europe Application No. 10194771.1.
Combined Chinese Office Action and Search Report issued Aug. 31, 2012 in Chinese Patent Application No. 201010594570.X (with English-language translation).
Partial European Search Report issued Feb. 28, 2011, in Application No. / Patent No. 10194771.1-2217.
Herbert Gross, et al., "Aberration Theory and Correction of Optical Systems", "31.3", Handbook of Optical Systems, Wiley-VCH Verlag, vol. 3, XP002619942, Jan. 1, 2007, pp. 268-289.
"PGF Diagramm", Optisches Glas, Schott, XP002612262, Jan. 1, 1981, 1 page.
Japanese Office Action (2009-284551) dated Sep. 10, 2013.
Japanese Office Action issued Nov. 5, 2013, in Japan Patent Application No. 2010-058463.

* cited by examiner

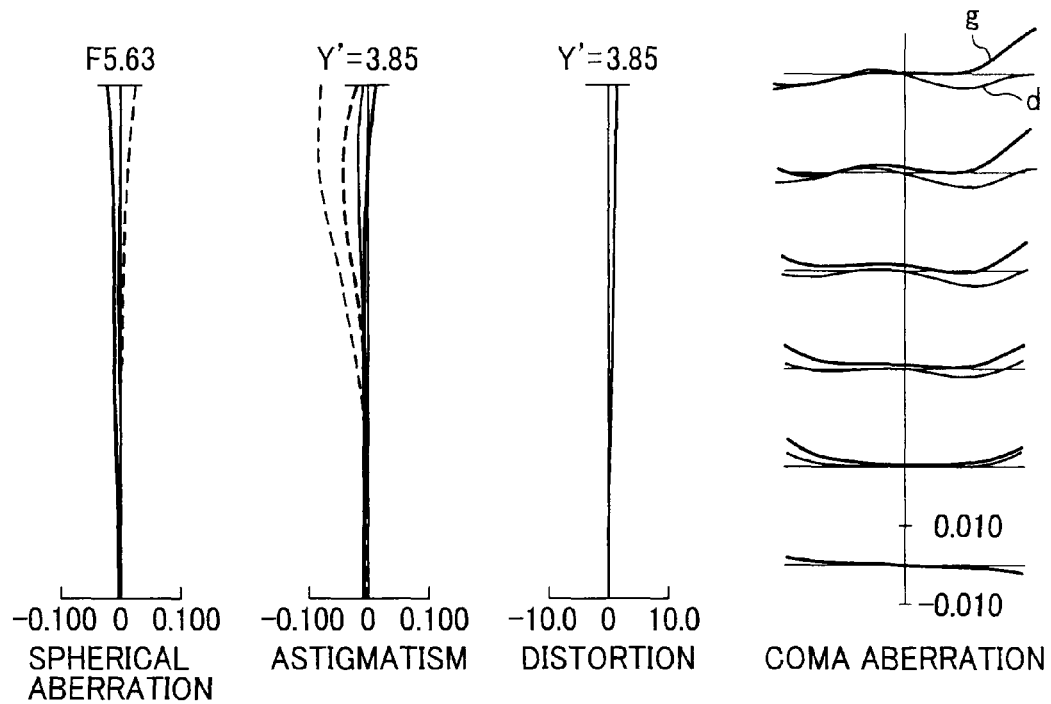
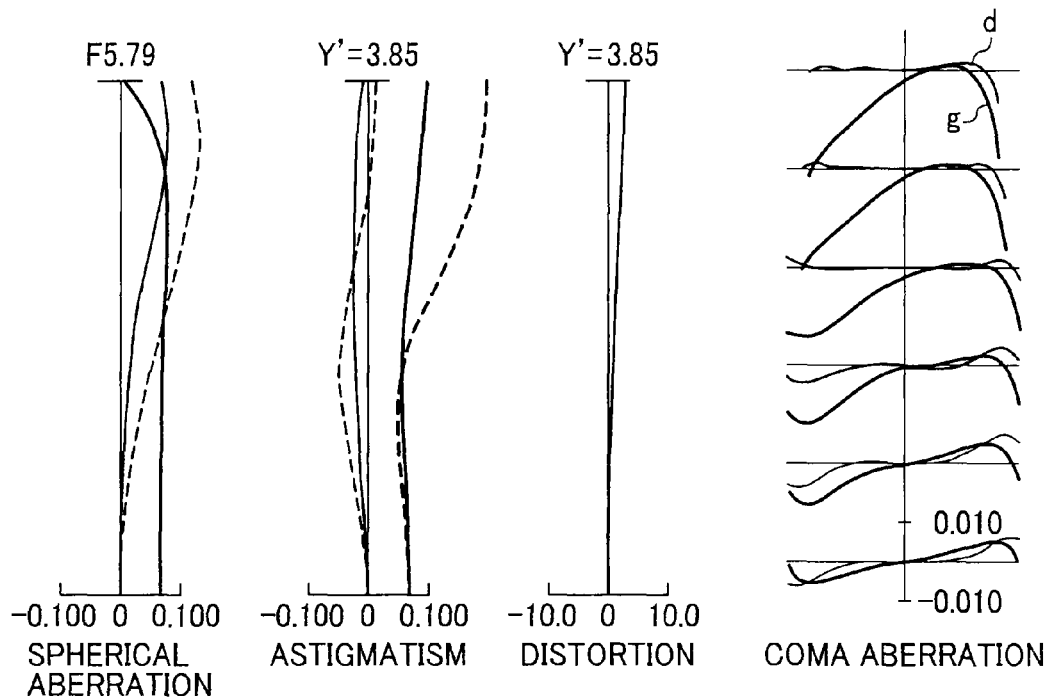

ZOOM LENS, CAMERA APPARATUS, INFORMATION DEVICE AND MOBILE INFORMATION TERMINAL APPARATUS

CROSS REFERENCE TO RELATED APPLICATIONS

The present application is based on and claims priority from Japanese Application Numbers 2009-284551, filed on Dec. 15, 2009 and 2010-058463, filed on Mar. 15, 2010, the disclosure of which is hereby incorporated by reference herein in its entirety.

BACKGROUND OF THE INVENTION

1. Field of the Invention

The present invention relates to a zoom lens, camera apparatus, information device having a photographing function and a mobile information terminal apparatus.

2. Description of the Related Art

Recently, in widely used digital cameras, high performance and small size have been further required and therefore a high-performance and small-size zoom lens which is installed therein as a photographing lens is also required.

In the zoom lens, in order to reduce the size, it is required to reduce an entire length (distance from a most object side lens surface to an imaging plane) in use, and it is important for reduction of size to reduce an entire length in a collapsed state by reducing a thickness of each lens group.

As the high performance of the zoom lens, a resolution corresponding to an image pickup device having at least 8 million pixels, more preferably 10 million pixels, further preferably 15 million pixels is required for an entire zooming range.

Furthermore, a wider field angle of a photographing lens is required by many users and a half field angle of the zoom lens at a wide angle end is preferably 38 degrees or more. The half field angle of 38 degrees corresponds to a focal length of 28 mm in a case of a silver-salt camera using a silver-salt film (so-called Leica film) having a width of 35 mm.

Furthermore, high magnification ratio is also required. The zoom lens having a focal length corresponding to of 28 to 200 mm in a 35 mm silver salt camera conversion (about 7.1 times) enables all of the general photographing. However, the magnification ratio of about 8 times is commonly used and higher magnification ratio is required, that is, the focal length corresponding to 28 to 300 mm in a 35 mm silver salt camera conversion (about 10.7 times) is required.

As the zoom lens for the digital camera, various types of the zoom lenses are used. However, lens group configuration including 5 lens groups or more is not suitable because it is difficult to achieve small size and small thickness of the entire lens system.

As a well known zoom lens having high magnification ratio or large diameter, the zoom lens including a first lens group having a positive focal length, a second lens group having a negative focal length, a third lens group having a positive focal length, and a fourth lens group having a positive focal length, which are disposed in order from an object side is disclosed in each of Japanese Patent Application Publication Nos. 2008-107559, 2008-112013, 2008-185782, 2008-203453 and 2008-145501.

In the zoom lens disclosed in the above documents, which has a four-lens group configuration including positive-negative-positive-positive lens groups, there is no zoom lens having all of a half field angle of 38 degrees or more, a magnification ratio of 8 times or more, and a resolution corresponding to 8 million pixels.

As the zoom lens suitable for a high magnification ratio, the zoom lens including a first lens group having a positive focal length, a second lens group having a negative focal length, a third lens group having a positive focal length and a fourth lens group having a positive focal length, which are disposed in order from an object side. When changing the magnification from a wide angle end to a telephoto end, an interval between the first lens group and the second lens group is increased, an interval between the second lens group and the third lens group is decreased and an interval between the third lens group and the fourth lens group is changed.

As the zoom lens of this type, the first lens group is reciprocated and moved in an arc which is convex at an image side when changing the magnification. In this type, if a movement amount of the second lens group which largely shares a function of the magnification operation in order to achieve the high magnification ratio is attempted to be largely ensured, an aperture stop provided at a vicinity of the third lens group is far from the first lens group even when the zoom lens is at the wide angle end. Accordingly, when the wide angle zoom lens is required, the first lens group is required to be large.

Therefore, in order to achieve a wide angle, high magnification and small size zoom lens, the first lens group is preferably moved so as to be positioned at the telephoto end to the position which is at the object side of the position at the wide angle end.

The entire length of the zoom lens at the wide angle end is reduced so as to be less than the entire length of the zoom lens at the telephoto end so that the size of the first lens is prevented from increasing and a sufficient wide angle can be achieved.

On the other hand, in a correction of the chromatic aberration which readily occurs with increasing the magnification ratio and the focal length, it is effective to use the lens having an anomalous dispersion property, as well known.

As the zoom lens including a first lens group having a positive focal length, a second lens group having a negative focal length, a third lens group having a positive focal length, and a fourth lens group having a positive focal length, which are disposed in order from an object side, and in which an interval between the first lens group and the second lens group is increased, an interval between the second lens group and the third lens group is decreased, and an interval between the third lens group and the fourth lens group is changed when changing the magnification, the zoom lens using an anomalous dispersion property is disclosed in Japanese Patent Application Publication Nos. H08-248317, and 2008-026837 and Japanese Patent Nos. 3391342 and 4405747.

In these Documents, in the zoom lens disclosed in Japanese Patent Application Publication No. H08-248317, the first lens group is fixed when changing the magnification and half field angle at the wide angle end is 25 degrees and a wide angle end is not sufficient.

The zoom lens disclosed in Japanese Patent No. 3391342 includes a four-lens group configuration having positive-negative-positive-positive lens groups (see Examples 1, 2 and 6) and the zoom lens has a field angle of about 29 to 32 degrees at the wide angle end so that the wide angle is not sufficiently achieved.

The zoom lens disclosed in Japanese Patent No. 4405747 has a wide angle, that is, a half field angle of about 37 degrees at the wide angle end. However, the lens configuration includes many lenses, that is, 14 lenses and therefore it is difficult to achieve the reduced entire length in a collapsed state and low cost.

The zoom lens disclosed in Japanese Patent Application Publication No. 2008-026837 has a comparatively small number of lenses, that is, 9 to 11 lenses so that wide angle and high magnification is achieved with a simple configuration. However, there is room for improvement in the small size because the entire length at the telephoto end is slightly large.

For example, the zoom lens disclosed in Japanese Patent Application Publication No. 2008-107559 has a wide field angle, that is, a half field angle of 40 degrees at the wide angle end, but the magnification ratio is about 5 times. The zoom lens disclosed in Japanese Patent Application Publication No. 2008-112013 has a wide angle, that is, a half field angle of substantially 40 degrees at the wide angle end and a large magnification ratio of 9 times. However, the distortion at the wide angle end is 10% or more and therefore there is room for improvement in performance.

Japanese Patent Application Publication No. 2008-185782 discloses, as a specific example, the zoom lens having a magnification ratio of about 9.5 times, but a half field angle is about 32 degrees at the wide angle end.

The zoom lens disclosed in Japanese Patent Application Publication Nos. 2008-203453 and 2008-145501 has a good performance and a wide angle but there is room for improvement in the magnification ratio.

As a general method for reducing a size of the zoom lens, it is known to reduce a number of lenses by increasing a power of each lens group. However, when simply using this method, it is difficult to correct various aberrations and decentering sensitivity of each lens groups (degradation degree of an imaging performance by decentering lens) is increased so that it is difficult to maintain a high optical performance.

If the wide field angle is tried to be achieved while performing this method, it becomes further difficult to correct various aberrations while suppressing increase in size of the entire lens system due to increase in height of off-axis light fluxes or increase of the distortion.

SUMMARY OF THE INVENTION

The present invention has been made in light of the circumstances described above, and an object of the present invention is to provide a zoom lens which includes four lens configuration having positive-negative-positive-positive refractive powers and has a sufficiently wide field angle, that is, half field angle of 38 degrees or more at the wide angle end and a magnification ratio of 7.1 times or more. The zoom lens also achieves small size with about 9 lenses configuration and resolution corresponding to an image pickup device having 10 to 15 million pixels while successfully correcting chromatic aberration, especially such as chromatic aberration on axis, chromatic aberration of magnification, which are readily generated.

A zoom lens according to an embodiment of the present invention includes a first lens group having a positive refractive power, a second lens group having a negative refractive power, an aperture stop, a third lens group having a positive refractive power, and a fourth lens group having a positive refractive power, which are disposed in order from an object side. The first lens group has a negative lens and a positive lens having a convex surface at an object side, which are disposed in order from the object side. An interval between the first lens group and the second lens group is increased and an interval between the second lens group and the third lens group is decreased when changing a magnification of the zoom lens from a wide angle end to a telephoto end. The first lens group and the third lens group are moved from positions at the wide angle end toward positions, which are at object sides thereof, at the telephoto end, respectively. The following conditions are satisfied:

$$1.52 < ndP < 1.62 \tag{1}$$

$$60.0 < vdP < 85.0 \tag{2}$$

where ndP is a refractive index of a material of the positive lens of the first lens group for a d line and vdP is a dispersion. A partial dispersion ratio Pg, F is defined by the following formula:

$$Pg, F = (ng - nF)/(nF - nC)$$

where ng is a refractive index of a lens material for g line, nF is a refractive index of the lens material for F line, and nC is a refractive index of the lens material for C line. Pg, FP is a partial dispersion ratio for a lens material of the positive lens of the first lens group and Pg, FN is a partial dispersion ratio for a lens material of the negative lens of the first lens group. The following condition is satisfied:

$$0.007 < \Delta Pg, FP < 0.050 \tag{3}$$

where $\Delta Pg, FP$ is defined by the following formula:

$$\Delta Pg, FP = Pg, FP - (-0.001802 \times vdP + 0.6483)$$

The following condition is satisfied:

$$|\Delta Pg, FP - \Delta Pg, FN| < 0.025 \tag{4}$$

where $\Delta Pg, FN$ is defined by the $$\Delta Pg, FN = Pg, FN - (-0.001802 \times vdN + 0.6483)$$

where vdN is a dispersion of material of the negative lens of the first lens group.

BRIEF DESCRIPTION OF THE DRAWINGS

FIG. 10 is a view illustrating aberration curves in the zoom lens according to Example 2 at the intermediate focal length position.

FIG. 11 is a view illustrating aberration curves in the zoom lens according to Example 2 at the telephoto end.

DETAILED DESCRIPTION OF THE PREFERRED EMBODIMENTS

[First Embodiment]

Figure 1:
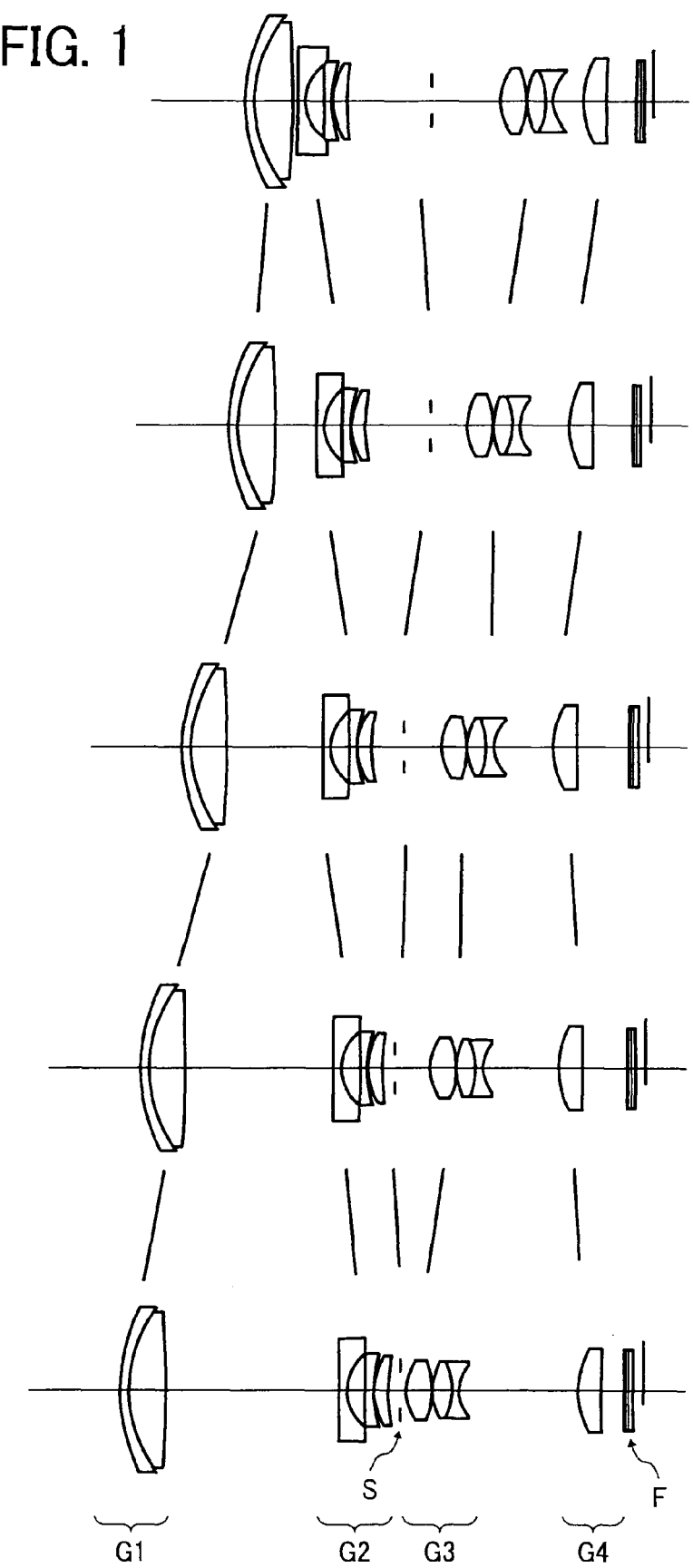
FIG. 1 is a view showing a configuration of a zoom lens of Example 1 and a displacement of each lens group when changing the magnification.
Figure 2:
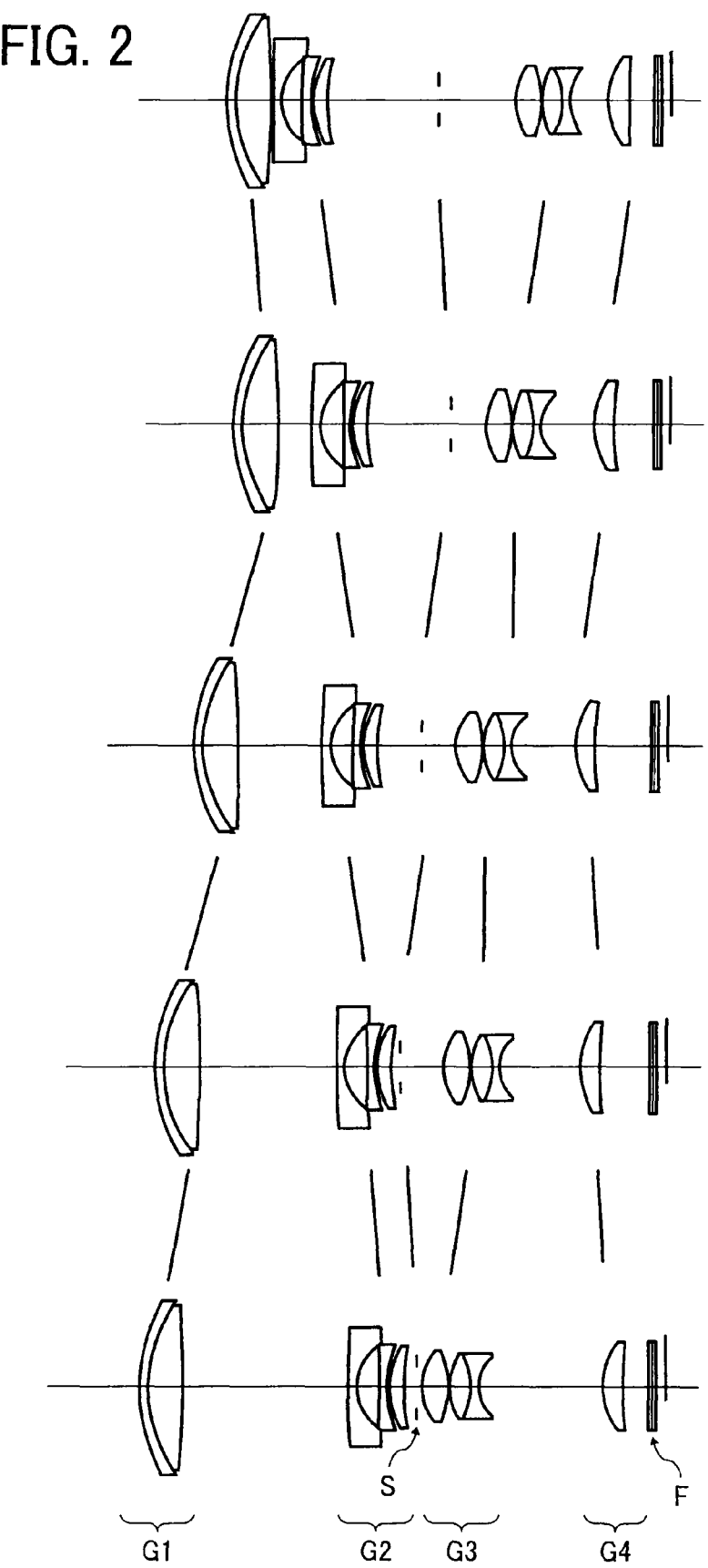
FIG. 2 is a view showing a configuration of a zoom lens of Example 2 and a displacement of each lens group when changing the magnification.
Figure 3:
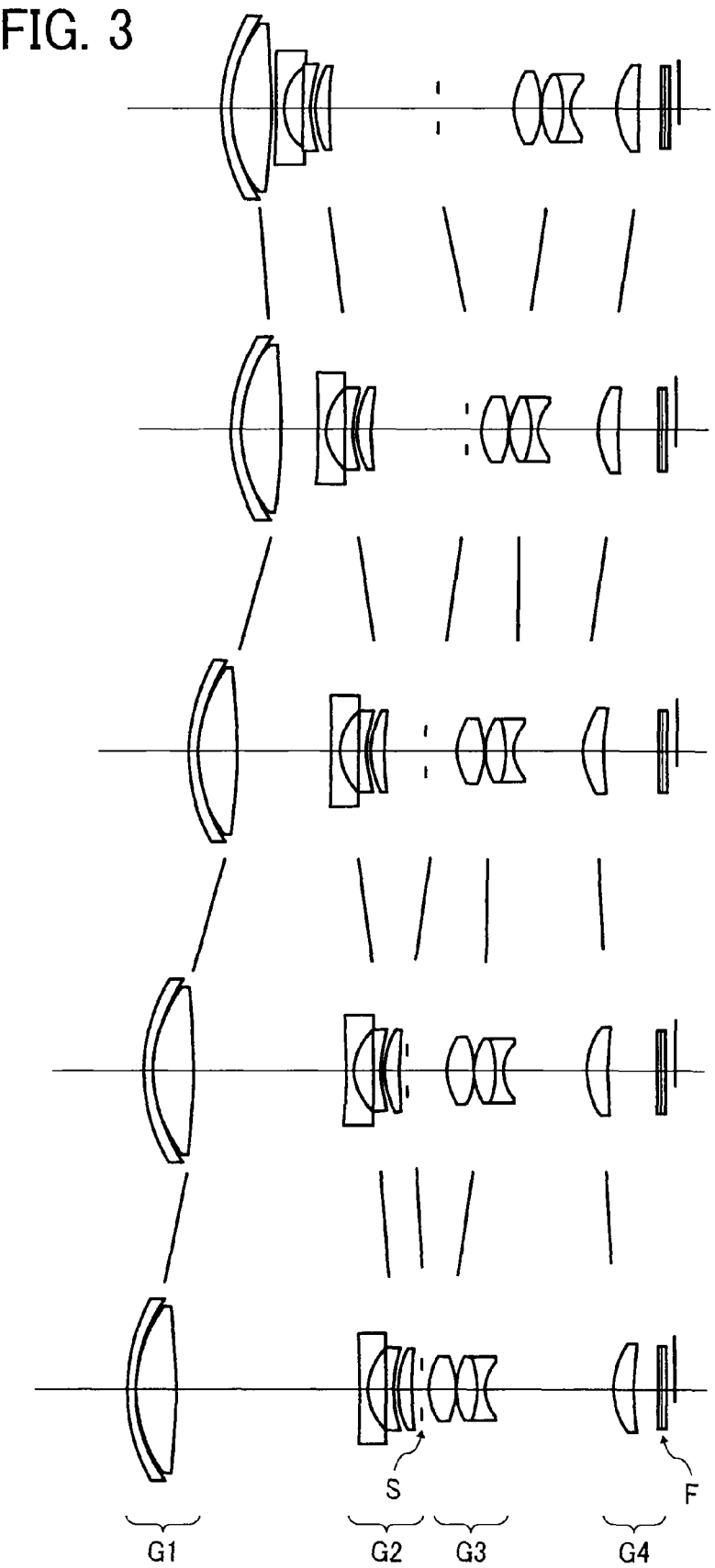
FIG. 3 is a view showing a configuration of a zoom lens of Example 3 and a displacement of each lens group when changing the magnification.
Figure 4:
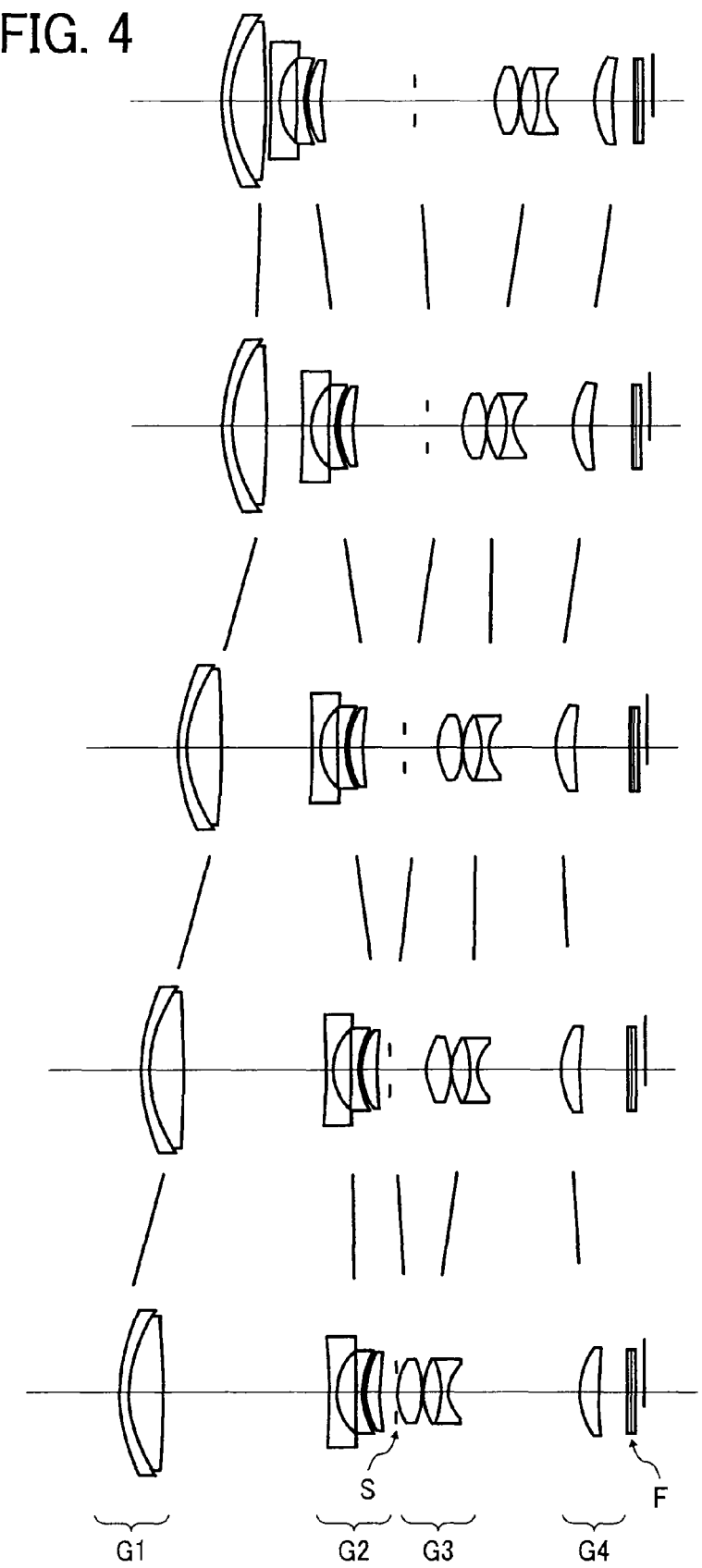
FIG. 4 is a view showing a configuration of a zoom lens of Example 4 and a displacement of each lens group when changing the magnification.
Figure 5:
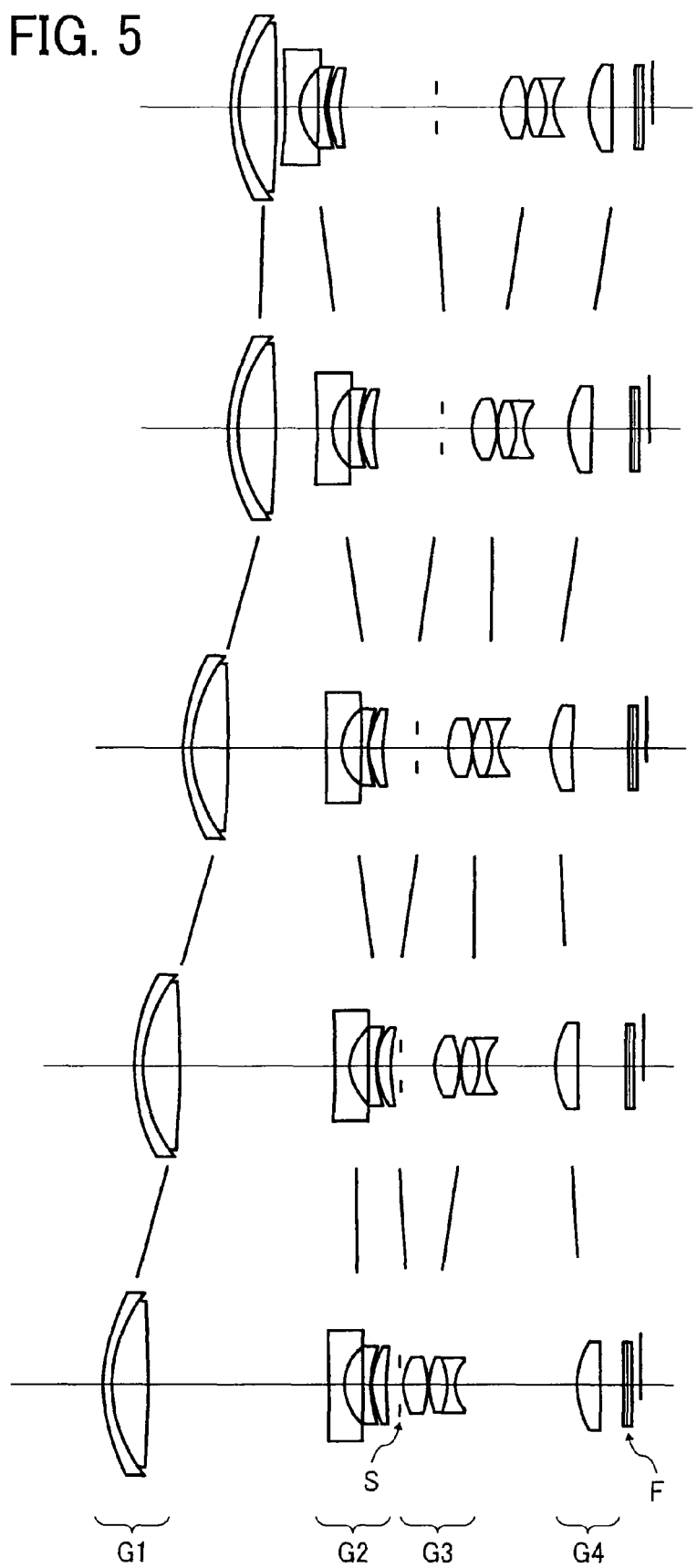
FIG. 5 is a view showing a configuration of a zoom lens of Example 5 and a displacement of each lens group when changing the magnification.

A zoom lens according to a first embodiment of the present invention includes a first lens group having a positive refractive power, a second lens group having a negative refractive power, an aperture stop, a third lens group having a positive refractive power and a fourth lens group having a positive refractive power, which are disposed in order from an object side.

The first lens group having the positive refractive power has a negative lens and a positive lens having a convex surface at an object side, which are disposed in order from an object side.

When changing a magnification of the zoom lens from a wide angle end to a telephoto end, an interval between the first lens group and the second lens group is increased, an interval between the second lens group and the third lens group is decreased. The first lens group and the third lens group are moved from positions at the wide angle end toward positions, which are at object sides thereof, at the telephoto end, respectively.

The following conditions (1) to (4) are satisfied. That is, $$1.52 < ndP < 1.62 \tag{1}$$

$$60.0 < vdP < 85.0 \tag{2}$$

$$0.007 < \Delta Pg, FP < 0.050 \tag{3}$$

$$|\Delta Pg, FP - \Delta Pg, FN| < 0.025 \tag{4}$$

A parameter ndP in the condition (1) is a refractive index of a material of the positive lens of the first lens group for a d line.

A parameter vdP in the condition (2) is a dispersion of the material of the positive lens of the first lens group.

As is well known, a partial dispersion ratio Pg, F is defined by the following formula:

$$Pg, F = (ng - nF)/(nF - nC)$$

where ng, nF, and nC are refractive indexes of a lens material for g line, F line, and C line, respectively.

Pg, FP is a partial dispersion ratio for a lens material of the positive lens of the first lens group and Pg, FN is a partial dispersion ratio for a lens material of the negative lens of the first lens group.

A parameter $\Delta Pg$, FP in the condition (3) is defined by the following formula:

$$\Delta Pg, FP = Pg, FP - (-0.001802 \times vdP + 0.6483)$$

A parameter $\Delta Pg$, FN in the condition (4) is defined by the $$\Delta Pg, FN = Pg, FN - (-0.001802 \times vdN + 0.6483)$$

where vdN is a dispersion of material of the negative lens of the first lens group.

That is, the above conditions (1), (2) and (3) give the refractive index and the dispersion of the material of the positive lens of the first lens group, and a range of $\Delta Pg$, FP, and the above condition (4) gives the refractive index and the dispersion of the negative lens of the first lens group and a range of $\Delta Pg$, FN, together with the above conditions.

In the zoom lens, the following condition is preferably satisfied:

$$4.0 < fap/fw < 8.0 \quad (5)$$

where fap is a focal length of the positive lens of the first lens group and fw is a focal length of the zoom lens at the wide angle end.

In the zoom lens, the following condition is preferably satisfied:

$$5.0 < f1/fw < 8.0 \quad (6)$$

where f1 is a focal length of the first lens group and fw is a focal length of the zoom lens at the wide angle end.

In the zoom lens, the following condition is preferably satisfied:

$$0.50 < |f2|/f3 < 0.85 \quad (7)$$

where f2 is a focal length of the second lens group and f3 is a focal length of the third lens group.

In the zoom lens, the following condition is preferably satisfied:

$$0.10 < X1/fT < 0.35 \quad (8)$$

where X1 is a total movement amount of the first lens group when changing the magnification of the zoom lens from the wide angle end to the telephoto end, and fT is a focal length of the zoom lens at the telephoto end.

In the zoom lens, the following condition is preferably satisfied:

$$0.10 < X3/fT < 0.30 \quad (9)$$

where X3 is a total movement amount of the third lens group when changing the magnification of the zoom lens from the wide angle end to the telephoto end, and fT is a focal length of the zoom lens at the telephoto end.

In the zoom lens, the third lens group may have a most image side lens which is a negative lens having a largely concave surface at an image side and the following condition is preferably satisfied:

$$0.5 < |r3R|/fw < 1.2 \quad (10)$$

where r3R is a curvature radius of the image side surface of the negative lens and fw is a focal length of the zoom lens at the wide angle end.

In the zoom lens, the positive lens of the first lens group has preferably an aspheric surface. In this case, the negative lens and the positive lens of the first lens group are preferably cemented to each other.

A camera apparatus according to an embodiment of the present invention may have the zoom lens as a photographing optical system.

A mobile information terminal apparatus or a personal digital assistance according to an embodiment of the present invention may have a camera function device having the zoom lens as a photographing apparatus.

Hereinafter, supplementary explanation will be made.

In such a zoom lens according to an embodiment of the present invention, that is, the zoom lens of a four-lens configuration having positive-negative-positive-positive refractive powers, generally, the second lens group is configured as a so-called "variator" which has a main magnification function. However, in the zoom lens according to an embodiment of the present invention, the third lens group also has a magnification function to reduce the burden of the second lens group so that degree of freedom for an aberration correction which is difficult in a wider angle- and higher magnification-zoom lens is ensured.

Furthermore, if the first lens group is configured to be largely moved toward the object side when changing the magnification of the zoom lens from the wide angle end to the telephoto end, a height of a light flux passing through the first lens group at the wide angle end is lowered. Accordingly, the zoom lens is configured such that the size of the first lens group is prevented from increasing in a wider angle zoom lens and a sufficient interval between the first and second lens groups is ensured to achieve a large focal length.

That is, an interval between the first lens group and the second lens group is increased and an interval between the second lens group and the third lens group is decreased when changing the magnification from the wide angle end to the telephoto end, so that the magnification (absolute value) is increased and therefore the magnification function is shared by the second and third lens groups.

Generally, if it is tried to achieve high magnification ratio, especially large focal length at the telephoto end, it becomes difficult to correct the secondary spectrum of the chromatic aberration on axis at the telephoto side. Furthermore, if it is tried to decrease focal length at the wide angle end to achieve wide field angle, it becomes difficult to correct the secondary spectrum of the chromatic aberration of magnification at the wide angle side.

The zoom lens according to an embodiment of the present invention is to correct these chromatic aberrations by use of an anomalous dispersion material (material having a large anomalous dispersion property). The zoom lens has features in the optical properties.

In order to reduce the secondary spectrum of the chromatic aberration on axis, using a special low dispersion glass is effective.

Especially, at least at the telephoto end, since the first lens group has the largest height of on-axis light fluxes, it is possible to sufficiently reduce the secondary spectrum of the chromatic aberration on axis by using the special low dispersion glass for the first lens group.

However, generally, the special low dispersion glass has a low refractive index so that correction ability of the monochromatic aberration is readily decreased. Therefore, if the monochromatic aberration and the chromatic aberration are reduced in a balanced manner while the first lens group is configured by a small number of lenses, it is not necessarily sufficiently effective to use the special low dispersion glass.

In the zoom lens, the first lens group is configured by the positive lens having a refractive index, an Abbe number, and an anomalous dispersion property ($\Delta Pg$, FP) within a range satisfying the above conditions (1) to (3) and the negative lens having an anomalous dispersion property ($\Delta Pg$, FN) satisfying the condition (4) complying with the conditions (1) to (3).

Thereby, it is possible that the first lens group is configured by a small number of lenses, that is, two lenses, a secondary spectrum in a chromatic aberration is reduced, and monochromatic aberration is sufficiently corrected.

If the value of the condition (1) is less than the lower limit, the monochromatic aberration cannot be sufficiently corrected, and if the value of the condition (2) is less than the lower limit, the chromatic aberration cannot be sufficiently corrected.

If the value of the condition (3) is less than the lower limit or the value of the condition (4) is more than the upper limit, the secondary spectrum in the chromatic aberration cannot be sufficiently corrected.

There does not exist an optical glass in which the value of each condition (1), (2) and (3) is more than the upper limit, or even if exists, only special and expensive optical glass may exist and therefore it should not be in practical use.

The positive lens of the first lens group preferably satisfies the above condition (5).

If the value of the condition (5) is more than the upper limit, the refractive power of the positive lens using the anomalous dispersion material is not enough to sufficiently reduce the secondary spectrum so that the chromatic aberration cannot be sufficiently corrected in some cases. If the value of the condition (5) is less than the lower limit, it becomes difficult to balance the chromatic aberration correction and the spherical aberration correction so that there is disadvantage in a processing accuracy because of large curvature of each surface of the positive lens of the first lens group.

The condition (6) is effective to reduce the size of the entire zoom lens while successfully correcting the other aberrations.

If the value of the condition (6) is less than the lower limit, the imaging magnification of the second lens group is close to one and magnification efficiency is increased and therefore there is advantage for a high magnification ratio. However, each lens of the first lens group is required to have a large refractive power and the chromatic aberration especially at the telephoto end is readily deteriorated. Therefore, the first lens group is required to have a large thickness and a large diameter so that there is a disadvantage to achieve small size zoom lens especially in a collapsed state.

If the value of the condition (6) is more than the upper limit, contribution to the magnification of the second lens group is reduced and therefore highly variable magnification cannot be easily achieved.

The condition (7) is to control the refractive power of each lens group from the viewpoint of the aberration correction.

If the value of the condition (7) is less than the lower limit, the refractive power of the second lens group is too large. If the value of the condition (7) is more than the upper limit, the refractive power of the third lens group is too large. In both cases, the aberration change when changing the magnification is readily increased.

The condition (8) is to control a movement amount of the first lens group which is important for a wider angle and a larger focal length.

If the value of the condition (8) is less than the lower limit, the contribution to the magnification of the second lens group is reduced and a burden of the third lens group is required to be increased or the refractive powers of the first and second lens groups are required to be increased. In both cases, each aberration is readily deteriorated.

Furthermore, the entire length of the zoom lens at the wide angle end is increased so that heights of light fluxes passing through the first lens group are increased and the first lens group is subject to large size.

If the value of the condition (8) is more than the upper limit, the entire length of the zoom lens at the wide angle end is readily too decreased or the entire length of the zoom lens at the telephoto end is readily too increased. When the entire length of the zoom lens at the wide angle end is too decreased, a movement space of the third lens group is reduced and the contribution to the magnification of the third lens group is required to be reduced so that the aberration correction for the entire zoom lens becomes difficult.

When the entire length of the zoom lens at the telephoto end is too increased, the small size in an entire length direction is inhibited and a size of the zoom lens in a radial direction is increased in order to take a peripheral light at the telephoto end and image performance can be readily degraded due to a manufacturing error such as inclination of a lens barrel, or the like.

The parameter of the condition (8) preferably satisfies the following condition:

$$0.15 < X1/fT < 0.30 \quad (8A)$$

The condition (9) is to control the movement amount of the third lens group which shares a magnification operation with the second lens group.

If the value of the condition (9) is less than the lower limit, the contribution to the magnification of the third lens group is reduced and therefore it is necessary that a burden of the second lens group to the magnification operation is increased or the refractive power of the third lens group is increased. In both cases, each aberration is readily deteriorated.

If the value of the condition (9) is more than the upper limit, the entire length of the zoom lens at the wide angle end is increased and therefore heights of light fluxes passing through the first lens group are increased so that the size of the first lens group is readily increased.

The parameter of the condition (9) preferably satisfies the following condition:

$$0.15 < X3/fT < 0.25 \quad (9A)$$

The condition (10) is to successfully correct the aberration.

If the value of the condition (10) is less than the lower limit, the spherical aberration is readily excessively corrected. If the value of the condition (10) is more than the upper value, the spherical aberration is readily insufficiently corrected. If the value of the condition (10) is out of the condition (10), it is difficult to correct balance of the coma aberration as well as the spherical aberration. The outward or inward coma aberration readily occurs at an off-axis peripheral part.

The parameter of the condition (10) preferably satisfies the following condition:

$$0.7 < |r3R|/fW < 1.0 \quad (10A)$$

In order to increase degrees of freedom in the aberration correction, the positive lens of the first lens group may be configured to have at least one aspheric surface. As the optical glass having the anomalous dispersion property satisfying the conditions (1) to (3), an optical glass suitable to be molded in an aspheric surface by a glass molding technology has been developed and thereby a low cost aspheric surface lens having a stable performance can be obtained.

At the telephoto end, heavy light fluxes pass through the first lens group so that each lens surface in the first lens group is required to have a high surface accuracy. It is difficult that an aspheric surface lens molded and formed as a molded article has a surface accuracy in relation to a spherical surface lens formed as a cut article. Accordingly, the positive lens which is the aspheric surface lens and the negative lens which is a spherical surface are cemented with each other. Thereby, degradation in image performance due to degrade of the surface accuracy on a cemented surface can be suppressed.

In the zoom lens, the aperture stop is disposed between the second lens group and the third lens group, and the aperture stop can be moved independently from adjacent lens groups (the second lens group and the third lens group).

By the above configuration, more appropriate light flux paths can be selected at any position in the large magnification range, that is, 10 times or more. Accordingly, especially degrees of freedom in the correction of the coma aberration, field curvature and the like are improved so that off-axis performance can be improved.

An interval between the aperture stop and the third lens group is preferably increased at the wide angle end more than at the telephoto end.

If the anomalous dispersion material is used for the third lens group, the third lens group is separated from the aperture stop at the wide angle end and moved to be close to the aperture stop at the telephoto end. Thereby, the anomalous dispersion property is effective to correct the secondary spectrum of the chromatic aberration of magnification at the wide angle end and is effective to correct the secondary spectrum of the chromatic aberration on axis at the telephoto end.

Accordingly, it is possible to successfully correct the chromatic aberration at a whole range of the magnification.

In addition, it is possible to relatively move the aperture stop to the first lens group at the wide angle end to reduce the height of the light fluxes passing through the first lens group so that the small size of the first lens group can be further improved.

As described above, if the interval between the aperture stop and the third lens group is increased at the wide angle end more than that at the telephoto end, the following condition is preferably satisfied for the interval:

$$0.05 < dSW/fT < 0.20$$

where dSW is an interval between the aperture stop and the most object side surface of the third lens group on an optical axis at the wide angle end.

If the value dSW/fT is 0.05 or less, the height of the light flux passing through the third lens group at the wide angle end is reduced so that it is difficult to effectively reduce the secondary spectrum of the chromatic aberration of magnification at the wide angle end. Similarly, the height of the light flux passing through the first lens group at the wide angle end is excessively increased so that the size of the first lens group is increased.

If the value dSW/fT is 0.20 or more, the height of the light flux passing through the third lens group at the wide angle end is excessively increased so that the imaging plane is inclined over or a barreled distortion is increased. Then, it is difficult to ensure performance especially at the wide angle range.

The first lens group is preferably configured by two lenses, that is, a negative meniscus lens having a convex surface at an object side and a positive lens having a largely convex surface at an object side, which are disposed in order from the object side.

In order to achieve high magnification and especially a large focal length at the telephoto end, the combined magnification ratio of the second lens group, the third lens group and the fourth lens group is required to be increased and then the aberration occurring in the first lens group is enlarged on an image plane.

Accordingly, in order to promote the high magnification, an amount of the aberration occurring in the first lens group is required to be reduced and therefore the first lens group is configured as described above.

The second lens group is preferably configured by three lenses, that is, a negative lens having a surface with a large curvature at the image side, a negative lens having a surface with a large curvature at the image side, and a positive lens having a surface with a large curvature at the object side.

By disposing the negative lens, the negative lens, and the positive lens in order from the object side, so that it is possible that a principal point of the second lens group is positioned at the image side to reduce the entire length of the optical system at the telephoto end.

At this time, the material of each lens in the second lens group preferably satisfies the following conditions:

$$1.75 < N21 < 2.10, \ 25 < v21 < 55$$

$$1.75 < N22 < 2.10, \ 25 < v22 < 55$$

$$1.75 < N23 < 2.10, \ 15 < v23 < 35$$

where N2i (i=1 to 3) is a refractive index of an i-th lens in order from the object side in the second lens group and v2i (i=1 to 3) is an Abbe number of the i-th lens in order from the object side in the second lens group.

By such a selection of the glass type, it is possible to sufficiently suppress the monochromatic aberration and to successfully correct the chromatic aberration.

The third lens group is preferably configured by three lenses, that is, the positive lens, the positive lens and the negative lens, which are disposed in order from the object side. The second lens and the third lens from the object side may be appropriately cemented with each other.

The fourth lens group in the zoom lens is to ensure telecentric property by ensuring mainly an exit pupil distance and to perform focusing by moving the fourth lens group. In order to achieve the small size of the zoom lens system, the fourth lens preferably has a simple configuration and is preferably configured by a single positive lens.

Moreover, the zoom lens has a four lens group configuration but may have five lens group configuration in which a fifth lens group is disposed at an image side of the fourth lens group to improve degrees of freedom for ensuring performance.

In order to promote reduced size while maintaining good aberration correction, an aspheric surface is necessary and at least each of the second lens group and the third lens group preferably has at least one aspheric surface.

Especially, in the second lens group, both of the object side surface and the image side surface of the most object side lens are aspheric surfaces, so that the distortion, astigmatism and the like which are readily increased with the wider angle are effectively corrected.

As the aspheric surface lens, an optical glass, a molded optical plastic (a glass molded aspheric surface, a plastic molded aspheric surface), a thin resin layer molded and formed on a surface of a glass lens to be an aspheric surface (referred to as a hybrid aspheric surface, a replica aspheric surface, or the like), and the like can be used.

It is preferable that an aperture diameter of the aperture stop is constant independently from the variable magnification to simplify the mechanism. However, if the aperture diameter at the telephoto end is set to be larger than the aperture diameter at the wide angle end, variation of an F number with changing the magnification can be reduced.

When it is necessary to reduce amount of light fluxes reaching the image plane, the aperture diameter of the aperture stop may be narrowed. On the other hand, it is more preferable that the light amount may be reduced by inserting an ND filter, or the like without changing the aperture diameter, because degrade of resolution due to diffraction phenomenon can be prevented.

Hereinafter, Examples will be explained.

FIGS. 1 to 5 show an embodiment of the zoom lens. For sake of simplicity, same reference numerals are commonly used in these drawings.

The zoom lenses shown in FIGS. 1 to 5 respectively correspond to the later-described Examples 1 to 5.

FIGS. 1 to 5 show lenses in the zoom lens, lens group configuration, and a movement state of each lens group when changing the magnification. In each of FIGS. 1 to 5, the lens group configuration at the wide angle end is shown at an uppermost side, and the lens group configuration at the telephoto end is shown at a lowermost side so as to show by arrows a movement state of each lens group at some magnification positions between the wide angle end and the telephoto end.

The zoom lens shown in each of FIGS. 1 to 5 includes the first lens group G1 having the positive refractive power, the second lens group G2 having the negative refractive power, the third lens group G3 having the positive refractive power, and the fourth lens group G4 having the positive refractive power, which are disposed from the object side (left hand side in the drawings) to an image side (imaging plane side, right hand side in the drawings), and the aperture stop S disposed between the second lens group G2 and the third lens group G3. Each lens group is moved independently from each other to perform zooming operation.

When changing the magnification from the wide angle end to the telephoto end, the first lens group G1 and the third lens group G3 are monotonically moved on the optical axis toward the object side.

Accordingly, the positions of the first lens group G1 and the third lens group G3 at the telephoto end (lowermost side in the drawings) are set to the positions at the object sides of the position at the wide angle end (uppermost side in the drawings).

On the other hand, the second lens group is monotonically moved toward the image side and the fourth lens group G4 is at first moved toward the object side and then, after the intermediate focal length position, is moved so as to return toward the image side when changing the magnification from the wide angle end to the telephoto end.

As shown in the drawings, the aperture stop S is displaced independently from the lens groups. The aperture stop S is moved such that the displacement is curved in a serpentine shape when changing the magnification.

The first lens group G1 has the negative meniscus lens having the convex surface at the object side and the positive lens having the convex lens at the object side, which are disposed in order from the object side, and the second lens group G2 has the biconcave negative lens having the image side surface with the larger refractive power than the object side surface, the negative lens having the concave surface at the image side and the positive lens having the convex surface at the object side, which are disposed in order from the object side.

The third lens group G3 is configured by three lenses, that is, the positive lens, the positive lens, and the negative lens, which are disposed in order from the object side. The positive lens and the negative lens at the image side are cemented lenses.

The fourth lens group G4 is a single positive lens.

As shown in the later described specific Examples 1 to 5, the zoom lens in each of FIGS. 1 to 5 satisfies the conditions (1) to (10).

Reference numeral "F" in FIGS. 1 to 5 indicates a parallel plate optical element which is provided at an image side of the fourth lens group and may be one of various types of optical filter such as an optical low-pass filter, an infrared cut filter and the like or may be a cover glass (seal glass) for an image pickup device such as a CCD sensor, or the like.

Figure 37A:
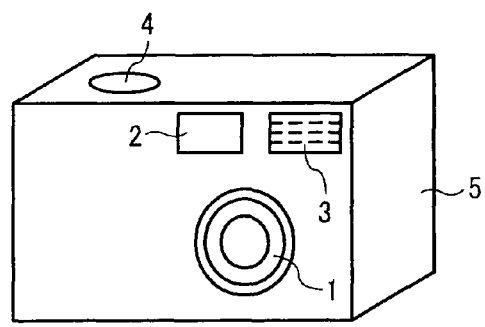
FIG. 37A is an explanatory view showing an embodiment of an information device having a photographing function.
Figure 37B:
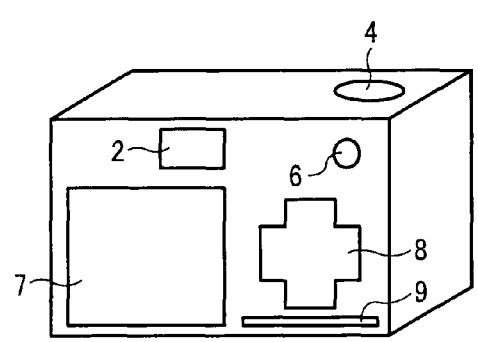
FIG. 37B is an explanatory view showing the embodiment of the information device having the photographing function.

FIG. 37A, 37B are explanatory views showing a mobile information terminal apparatus according to an embodiment of the present invention.

FIG. 37A is a view showing a front side and an upper side of the apparatus, and FIG. 37B is a view showing a back side of the apparatus. Reference numeral 1 indicates a photographing lens. The photographing lens 1 is a zoom lens. Reference numeral 2 indicates a finder, 3 indicates a strobe, 4 indicates a shutter button, 6 indicates a power switch and 7 indicates an LCD monitor.

Figure 38:
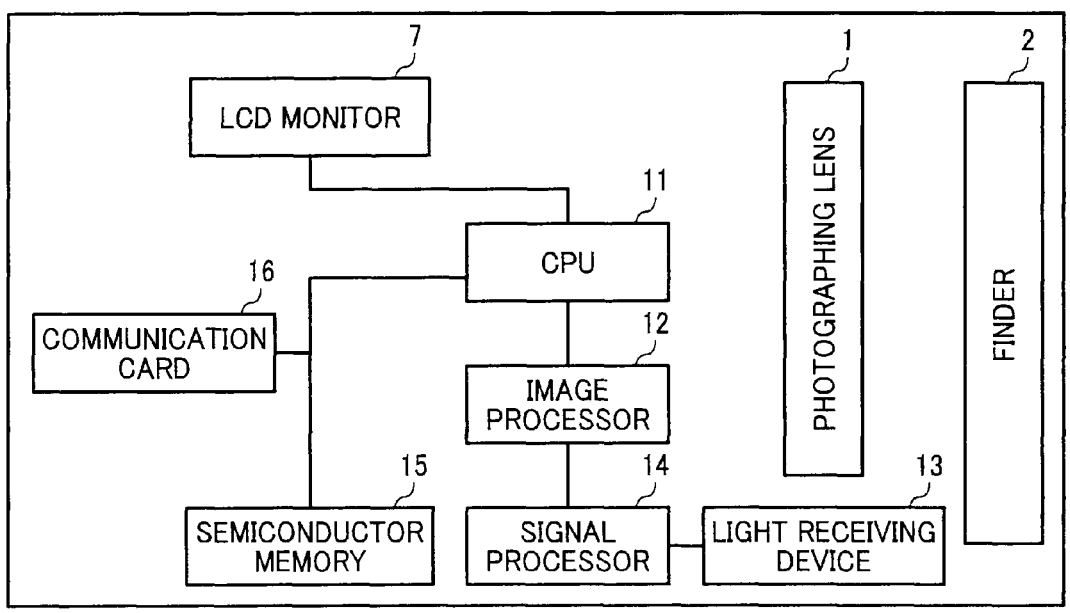
FIG. 38 is an explanatory view showing a system configuration of the information device shown in FIGS. 37A and 37B.

FIG. 38 is a view showing a system configuration of the mobile information terminal apparatus.

The mobile information terminal apparatus shown in FIG. 38 has the photographing lens 1 as the zoom lens and a light-receiving device 13 as the image pickup device. The mobile information terminal apparatus is configured such that a photographed subject image formed by the photographing lens is obtained by the light-receiving device 13. Output from the light receiving device 13 is processed by the signal processor 14 which is controlled by a central processing unit (CPU) 11 to be converted into digital information The digital information obtained by converting the output as an image is displayed on the LCD monitor 7, stored in the semiconductor memory 15, and communicated with outside by use of the communication card 16. The configuration except for the communication functions constitutes the camera apparatus.

As the photographing lens 1, the zoom lens according to an embodiment of the present invention, more particularly, Examples 1 to 9 is used.

On the LCD monitor 7, an image during photographing and the image stored in the semiconductor memory 15 can be displayed.

The photographing lens is, as shown in FIG. 37A, in a collapsed state when the camera is carried but not used, and then when the power is turned on by operation of the power switch, the lens barrel extends out. At this time, each lens group of the zoom lens in the lens barrel is, for example, disposed in a position at the wide angle end. If a not-illustrated zoom lever is operated, each lens group is moved so as to perform the magnification toward the telephoto end.

At this time, the magnification of the finder 2 is also changed with the change of the field angle of the photographing lens 1.

Focusing is performed by half-pressing the shutter button 4.

As described above, focusing is performed by moving the fourth lens group or moving the light-receiving device. When further pressing the shutter button 4, photographing is performed and then the above processing is performed.

When the image stored in the semiconductor memory 15 is displayed on the LCD monitor 7 or communicated with outside by use of the communication card 16, an operating button 8 is used. The semiconductor memory 15, the communication card 16, and the like are respectively inserted into a specialized or generalized slot 9 to be used.

When the photographing lens is in a collapsed state, each lens group in the zoom lens is not necessarily disposed on the optical axis. For example, a mechanism in which the third lens group and/or the fourth lens group are configured to be stored parallel to the other lens groups is used, further reduced thickness of the mobile information terminal apparatus can be achieved.

Hereinafter, as specific examples of the zoom lens, Examples 1 to 5 will be explained.

In Examples 1 to 5, a maximum image height is 3.850 mm but, in order to apply distortion correction image processing for enlarging by difference in generated negative distortion an image and generating the enlarged image at the wide angle end, the image height is set to be reduced as described later considering the distortion amount.

|  | Distortion amount at the wide angle end | Image Height at the wide angle end |
|---|---|---|
| Example 1 | −10.4% | 3.717 |
| Example 2 | −10.3% | 3.717 |
| Example 3 | −10.3% | 3.717 |
| Example 4 | −14.8% | 3.511 |
| Example 5 | −16.3% | 3.470 |

In each Example, a parallel plate optical element which is provided at an image side of the fourth lens group may be one of various types of optical filter such as an optical low-pass filter, an infrared cut filter and the like or may be a cover glass (seal glass) for an image pickup device such as a CCD sensor, or the like.

The material of each lens in each Example is an optical glass except for that the positive lens included in the fourth lens group is an optical plastic.

The following reference numbers are commonly used in each Example.
f: focal length of an entire system of the zoom lens
Fno: F number
ω: half field angle
R: curvature radius
D: surface interval
Nd: refracting index for d line
vd: Abbe number
K: conic constant of aspheric surface
A4: fourth order aspheric coefficient
A6: sixth order aspheric coefficient
A8: eighth order aspheric coefficient
A10: tenth order aspheric coefficient
A12: twelfth order aspheric coefficient
A14: fourteenth order aspheric coefficient
An aspheric surface is defined in the following formula:

$$X = CH^2/\{1+\sqrt{(1+K)C^2H^2)}\} + A4 \cdot H^4 + A6 \cdot H^6 + A8 \cdot H^8 + A10 \cdot H^{10} + A12 \cdot H^{12} + A14 \cdot H^{14}$$

where X is a depth in a direction of an optical axis, C is an inverse of a paraxial curvature radius (paraxial curvature), H is a height from an optical axis of the zoom lens. The glass types are indicated by optical glass names of HOYA INC., OHARA INC. and SUMITA Optical glass INC. A unit of an amount having a dimension in length is "mm" unless it is indicated that other unit is used.

The glass material in Example is indicated by the optical glass names of HOYA INC., OHARA INC. and SUMITA Optical glass INC.

EXAMPLE 1

| f = 5.05 to 52.00, F = 3.68 to 5.79, ω = 39.39 to 4.13 |||||||
|---|---|---|---|---|---|---|
| SURFACE NO. | R | D | Nd | vd | GLASS TYPE ||
| 1 | 20.155 | 0.9 | 1.80809 | 22.76 | S-NPH1 (OHARA) ||
| 2 | 14.968 | 3.9 | 1.59201 | 67.02 | M-PCD51 (HOYA) ||
| 3* | −112.112 | VARIABLE(A) | | | ||
| 4* | 119.295 | 0.81 | 1.86400 | 40.58 | L-LAH83 (OHARA) ||
| 5* | 4.938 | 1.92 | | | ||
| 6 | ∞ | 0.8 | 1.71700 | 47.93 | S-LAM3 (OHARA) ||
| 7 | 12.15 | 0.1 | | | ||
| 8 | 8.021 | 1.43 | 1.92286 | 18.90 | S-NPH2 (OHARA) ||
| 9 | 21.106 | VARIABLE(B) | | | ||
| 10 | APERTURE STOP | VARIABLE(C) | | | ||
| 11* | 5.485 | 2.74 | 1.55332 | 71.68 | M-FCD500 (HOYA) ||
| 12* | −9.162 | 0.1 | | | ||
| 13 | 8.021 | 1.97 | 1.64850 | 53.02 | S-BSM71 (OHARA) ||
| 14 | −7.737 | 0.81 | 1.91082 | 35.25 | TAFD35 (HOYA) ||
| 15 | 4.365 | VARIABLE(D) | | | ||
| 16* | 9.962 | 2.53 | 1.52528 | 56.2 | OPTICAL RESIN ||
| 17 | 360.115 | 1 | | | ||
| 18 | ∞ | 0.28 | 1.53770 | 66.60 | VARIOUS FILTERS ||
| 19 | ∞ | 0.5 | 1.50000 | 64.00 | VARIOUS FILTERS ||
| 20 | ∞ | | | | ||

In the above expression, and also in the following Examples, "*" indicates an aspheric surface.

[Aspheric Surface]

3rd Surface

K=0.0, A4=−1.09635E−05, A6=9.10281E−08, A8=−3.46715E−09, A10=5.91674E−11, A12=−5.25291E−13, A14=1.91404E−15

4th Surface

K=0.0, A4=−6.37154E−04, A6=4.15580E−05, A8=−1.17226E−06, A10=1.27640E−08, A12=6.91443E−11, A14=−2.21332E−12

5th Surface

K=−1.00544, A4=8.06488E−05, A6=5.17980E−05, A8=1.08845E−06, A10=−1.82076E−09, A12=−7.99599E−10, A14=1.91470E−11

11th Surface

K=−0.53335, A4=−4.35750E−04, A6=−8.76444E−06, A8=1.57593E−06, A10=−3.66583E−08, A12=−3.08470E−09,

12th Surface

K=3.42935, A4=1.02373E−03, A6=1.94730E−05, A8=1.11171E−06

16th Surface

K=2.33691, A4=−3.72766E−04, A6=1.43074E−05, A8=−1.71770E−06, A10=5.43386E−08, A12=−5.37347E−10, A14=−2.06217E−11

In the above expression, for example, "−2.06217E−11" means "−2.06217×10$^{-11}$", and the expression will be used hereinafter.

[Variable Amount]

|   | Wide Angle End f = 5.05 | Intermediate f = 16.22 | Telephoto End f = 52.00 |
|---|---|---|---|
| A | 0.5 | 9.8486 | 18.0925 |
| B | 8.7 | 3.2982 | 1.246 |
| C | 7.3208 | 3.8766 | 0.598 |
| D | 3.2178 | 6.2365 | 12.5522 |

"Intermediate" means an intermediate focal length.

[Values of Parameters in Conditions]

(1) 1.59201
(2) 67.02
(3) 0.0082
(4) 0.0152
(5) 4.47
(6) 6.43
(7) 0.662
(8) 0.24
(9) 0.17
(10) 0.86

EXAMPLE 2

| SURFACE NO. | R | D | Nd | vd | GLASS TYPE |
|---|---|---|---|---|---|
| \multicolumn{6}{c}{f = 6.05 to 51.96, F = 3.67 to 5.79, ω = 39.37 to 4.11} |
| 1 | 19.448 | 0.95 | 1.92286 | 18.9 | S-NPH2 (OHARA) |
| 2 | 15.882 | 3.79 | 1.55332 | 71.68 | M-FCD500 (HOYA) |
| 3 | −88.47 | VARIABLE(A) | | | |
| 4 | 43.841 | 0.94 | 1.864 | 40.58 | L-LAH83(OHARA) |
| 5 | 5.243 | 2.27 | | | |
| 6 | ∞ | 0.8 | 1.717 | 47.93 | S-LAM3 (OHARA) |
| 7 | 12.048 | 0.23 | | | |
| 8 | 8.706 | 1.52 | 1.92286 | 18.9 | S-NPH2 (OHARA) |
| 9 | 21.397 | VARIABLE(B) | | | |
| 10 | APERTURE STOP | VARIABLE(C) | | | |
| 11 | 5.736 | 2.77 | 1.5067 | 70.5 | K-PG325 (SUMITA) |
| 12 | −10.08 | 0.1 | | | |
| 13 | 7.051 | 1.22 | 1.6485 | 53.02 | S-BSM71 (OHARA) |
| 14 | −8.233 | 0.8 | 1.91082 | 35.25 | TAFD35 (HOAY) |
| 15 | 4.427 | VARIABLE(D) | | | |
| 16 | 8.807 | 2.1 | 1.51633 | 64.06 | L-BSL7 (OHARA) |
| 17 | 43.21 | 1 | | | |
| 18 | ∞ | 0.28 | 1.53770 | 66.60 | VARIOUS FILTERS |
| 19 | ∞ | 0.5 | 1.50000 | 64.00 | VARIOUS FILTERS |
| 20 | ∞ | | | | |

[Aspheric Surface]

3rd Surface

K=0.0, A4=1.35278E−05, A6=8.95766E−08, A8=−3.86146E−09, A10=7.00278E−11, A12=−6.45039E−13, A14=2.40481E−15

4th Surface

K=0.0, A4=−9.49729E−04, A6=5.87289E−05, A8=−2.10477E−06, A10=4.59402E−08, A12=−5.65777E−10, A14=2.97364E−12

5th Surface

K=−1.54431, A4=0.0, A6=6.84929E−05, A8=−1.22038E−06, A10=3.54747E−08, A12=−7.99599E−10, A14=1.91470E−11

11th Surface

K=−0.68526, A4=−1.94678E−03, A6=−2.25620E−06, A8=6.15466E−07, A10=1.06755E−08, A12=−3.08470E−09,

12th Surface

K=3.96979, A4=7.82420E−04, A6=1.72482E−05, A8=6.54876E−07

16th Surface

K=1.55318, A4=−4.41398E−04, A6=1.41931E−05, A8=−1.72608E−06, A10=5.49424E−08, A12=−5.37347E−10, A14=−2.06217E−11

[Variable Amount]

|   | Wide Angle End<br>f = 5.05 | Intermediate<br>f = 16.20 | Telephoto End<br>f = 51.96 |
|---|---|---|---|
| A | 0.0361 | 8.6979 | 17.2961 |
| B | 11.431 | 4.5782 | 1.3807 |
| C | 7.9465 | 3.4865 | 0.4738 |
| D | 4.2177 | 6.9111 | 13.3587 |

[Values of Parameters in Conditions]
(1) 1.55332
(2) 71.68
(3) 0.0211
(4) 0.0142
(5) 4.88
(6) 6.50
(7) 0.671
(8) 0.17
(9) 0.18
(10) 0.88

EXAMPLE 3

| | f = 5.04 to 51.95, F = 3.67 to 5.78, ω = 39.41 to 4.40 | | | | |
|---|---|---|---|---|---|
| SURFACE NO. | R | D | Nd | νd | GLASS TYPE |
| 1 | 21.183 | 0.95 | 1.92286 | 18.9 | S-NPH2 (OHARA) |
| 2 | 17.733 | 0.1 | | | |
| 3 | 16.751 | 4.05 | 1.4971 | 81.56 | M-FCD1 (HOYA) |
| 4* | −64.303 | VARIABLE(A) | | | |
| 5* | −279.537 | 0.8 | 1.864 | 40.58 | L-LAH83 (OHARA) |
| 6* | 5.84 | 1.98 | | | |
| 7 | ∞ | 0.8 | 1.717 | 47.93 | S-LAM3 (OHARA) |
| 8 | 13.746 | 0.45 | | | |
| 9 | 10.15 | 1.46 | 1.92286 | 18.9 | S-NPH2 (OHARA) |
| 10 | 30.838 | VARIABLE(B) | | | |
| 11 | APERTURE STOP | VARIABLE(C) | | | |
| 12* | 6.05 | 2.90 | 1.50670 | 70.50 | K˄PG325 (Sumita) |
| 13* | −10.252 | 0.1 | | | |
| 14 | 7.065 | 2.26 | 1.6485 | 53.02 | K-LaSFn22 (Sumita) |
| 15 | −10.603 | 0.8 | 1.89800 | 34.00 | TAFD35 (HOYA) |
| 16 | 4.39 | VARIABLE(D) | | | |
| 17* | 8.826 | 2.08 | 1.51633 | 64.06 | L-BSL7 (OHARA) |
| 18 | 37.674 | | | | |
| 19 | ∞ | 0.28 | 1.53770 | 66.60 | VARIOUS FILTERS |
| 20 | ∞ | 0.5 | 1.50000 | 64.00 | VARIOUS FILTERS |
| 21 | ∞ | | | | |

[Aspheric Surface]

4th Surface
K=0.0, A4=1.89263E−05, A6=7.63543E−09, A8=−1.03114E−09, A10=1.67737E−11, A12=−1.35683E−13, A14=4.58110E−16

5th Surface
K=0.0, A4=−4.60509E−04, A6=3.18741E−05, A8=−9.05550E−07, A10=6.92725E−09, A12=1.78659E−10, A14=−3.03736E−12

6th Surface
K=−1.21503, A4=0.0, A6=4.55742E−05, A8=−5.75514E−07, A10=9.00201E−09, A12=−7.99599E−10, A14=1.91470E−11

12th Surface
K=−0.65789, A4=−2.72916E−04, A6='14.11415E−06, A8=5.58797E−07, A10=6.86253E−09, A12=−3.08470E−09

13th Surface
K=4.09080, A4=7.22197E−04, A6=1.61233E−05, A8=4.79318E−07

17th Surface
K=1.62889, A4=−4.20155E−04, A6=1.04371E−05, A8=−1.42634E−06, A10=4.66226E−08, A12=−5.37347E−10, A14=−2.06217E−11

[Variable Amount]

|   | Wide Angle End f = 5.04 | Intermediate f = 16.18 | Telephoto End f = 51.95 |
|---|---|---|---|
| A | 0.5 | 9.7308 | 19.0942 |
| B | 11.5 | 4.4286 | 1.0791 |
| C | 8.1809 | 3.4384 | 0.7423 |
| D | 4.8769 | 7.3168 | 13.5601 |

[Values of Parameters in Conditions]
(1) 1.49710
(2) 81.56
(3) 0.0370
(4) 0.0017
(5) 5.39
(6) 6.88
(7) 0.679
(8) 0.18
(9) 0.17
(10) 0.87

EXAMPLE 4

| | f = 5.05 to 52.00, F = 3.67 to 5.79, ω = 39.20 to 4.40 | | | | |
|---|---|---|---|---|---|
| SURFACE NO. | R | D | Nd | vd | GLASS TYPE |
| 1 | 21.448 | 0.9 | 1.80809 | 22.76 | S-NPH1 (OHARA) |
| 2 | 15.315 | 3.61 | 1.61881 | 63.85 | M-PCD4 (HOYA) |
| 3* | −99.245 | VARIABLE(A) | | | |
| 4* | −123.285 | 0.87 | 1.864 | 40.58 | L-LAH83 (OHARA) |
| 5* | 6.343 | 1.85 | | | |
| 6 | ∞ | 0.8 | 1.717 | 47.93 | S-LAM3 (OHARA) |
| 7 | 9.517 | 0.25 | | | |
| 8 | 8.525 | 1.55 | 1.92286 | 18.9 | S-NPH2 (OHARA) |
| 9 | 25.133 | VARIABLE(B) | | | |
| 10 | APERTURE STOP | VARIABLE(C) | | | |
| 11* | 5.931 | 2.55 | 1.5532 | 71.68 | M-FCD500 (HOYA) |
| 12* | −10.424 | 0.1 | | | |
| 13 | 6.909 | 1.94 | 1.6485 | 53.02 | S-BSM71 (OHARA) |
| 14 | −9.82 | 0.8 | 1.91082 | 35.25 | TAFD35 (HOYA) |
| 15 | 4.316 | VARIABLE(D) | | | |
| 16* | 9.076 | 1.96 | 1.52528 | 56.2 | OPTICAL RESIN |
| 17 | 40.176 | 1 | | | |
| 18 | ∞ | 0.28 | 1.53770 | 66.60 | VARIOUS FILTERS |
| 19 | ∞ | 0.5 | 1.50000 | 64.00 | VARIOUS FILTERS |
| 20 | ∞ | | | | |

[Aspheric Surface]

3rd Surface
K=0.0, A4=9.73599E−06, A6=5.28612E−08, A8=−2.65333E−09, A10=5.44143E−11, A12=−5.62764E−13, A14=2.33013E−15

4th Surface
K=0.0, A4=−1.23735E−03, A6=9.06315E−05, A8=−2.67392E−06, A10=3.95821E−08, A12=−2.58346E−10, A14=2.42344E−13

5th Surface
K=−2.12985, A4=−4.84873E−04, A6=8.51764E−05, A8=1.45184E−07, A10=1.91653E−08, A12=−7.99599E−10, A14=1.91470E−11

11th Surface
K=−0.69091, A4 −3.59874E−04, A6=4.67829E−06, A8=−1.72488E−06, A10=2.00195E−08, A12=−3.08470E−09

12th Surface
K=3.41449, A4=5.00059E−04, A6=1.87686E−05, A8=−2.01509E−06

16th Surface
K=1.77976, A4=−3.60125E−04, A6=5.64619E−06, A8=−1.30489E−06, A10=4.54423E−08, A12=−5.37347E−10, A14=−2.06217E−11

[Variable Amount]

|   | Wide Angle End f = 5.05 | Intermediate f = 16.21 | Telephoto End f = 52.00 |
|---|---|---|---|
| A | 0.5 | 9.5004 | 17.2711 |
| B | 9.7483 | 4.2388 | 1.74 |
| C | 8.3865 | 3.5434 | 0.1 |
| D | 5.0891 | 7.0465 | 13.845 |

[Values of Parameters in Conditions]
(1) 1.61881
(2) 63.85
(3) 0.0084
(4) 0.0151
(5) 4.30
(6) 6.32
(7) 0.657
(8) 0.19
(9) 0.18
(10) 0.85

EXAMPLE 5 f = 5.04 to 51.95, F = 3.67 to 5.78, ω = 39.46 to 4.44

| SURFACE NO. | R | D | Nd | vd | GLASS TYPE |
|---|---|---|---|---|---|
| 1 | 21.191 | 0.9 | 1.80809 | 22.76 | S-NPH1 (OHARA) |
| 2 | 15.852 | 3.9 | 1.61881 | 63.85 | M-PCD4 (HOYA) |
| 3* | −143.017 | VARIABLE(A) | | | |
| 4* | 419.225 | 4.59 | 1.864 | 40.58 | L-LAH83 (OHARA) |
| 5* | 5.285 | 1.93 | | | |
| 6 | ∞ | 0.8 | 1.717 | 47.93 | S-LAM3 (OHARA) |
| 7 | 12.486 | 0.1 | | | |
| 8 | 8.54 | 1.52 | 1.92286 | 18.9 | S-NPH2 (OHARA) |
| 9 | 24.016 | VARIABLE(B) | | | |
| 10 | APERTURE STOP | VARIABLE(C) | | | |
| 11* | 5.457 | 2.66 | 1.55332 | 71.68 | M-FCD500 (HOYA) |
| 12* | −9.278 | 0.1 | | | |
| 13 | 8.008 | 1.98 | 1.6485 | 53.02 | S-BSM71 (OHARA) |
| 14 | −7.943 | 0.81 | 1.91082 | 35.25 | TAFD35 (HOYA) |
| 15 | 4.377 | VARIABLE(D) | | | |
| 16* | 10.077 | 2.4 | 1.52528 | 56.2 | OPTICAL RESIN |
| 17 | 262.531 | 1 | | | |
| 18 | ∞ | 0.28 | 1.53770 | 66.60 | VARIOUS FILTERS |
| 19 | ∞ | 0.5 | 1.50000 | 64.00 | VARIOUS FILTERS |
| 20 | ∞ | | | | |

[Aspheric Surface]

3rd Surface
K=0.0, A4=7.26830E−06, A6=9.21053E−08, A8=−3.38760E−09, A10=5.94058E−11, A12=−5.29773E−13, A14=1.89355E−15

4th Surface
K=0.0, A4=−6.99380E−04, A6=4.09819E−05, A8=−1.17604E−06, A10=1.37789E−08, A12=4.22536E−11, A14=−1.74611E−12

5th Surface
K=−1.22065, A4=−1.16244E−04, A6=6.79551E−05, A8=−4.05946E−07, A10=−1.43926E−08, A12=−7.99599E−10, A14=1.91470E−11

11th Surface
K=−0.53812, A4=−4.44378E−04, A6=−6.28155E−06, A8=1.52390E−06, A10=−4.41932E−08, A12=−3.08470E−09

12th Surface
K=3.51770, A4=1.01912E−03, A6=2.16533E−05, A8=8.68286E−07

16th Surface
K=2.37946, A4=−2.75993E−04, A6=8.38270E−06, A8=−1.50942E−06, A10=5.29442E−08, A12=−5.37347E−10, A14=−2.06217E−11

[Variable Amount]

|   | Wide Angle End f = 5.04 | Intermediate f = 16.17 | Telephoto End f = 51.95 |
|---|---|---|---|
| A | 0.807 | 10.3187 | 19.0991 |
| B | 9.9606 | 3.5458 | 1.5091 |
| C | 7.0147 | 3.272 | 0.3289 |
| D | 3.9433 | 5.5042 | 13.0884 |

[Values of Parameters in Conditions]
(1) 1.61881
(2) 63.85
(3) 0.0084
(4) 0.0151
(5) 4.62
(6) 6.95
(7) 0.695
(8) 0.24
(9) 0.18
(10) 0.87

Figure 6:
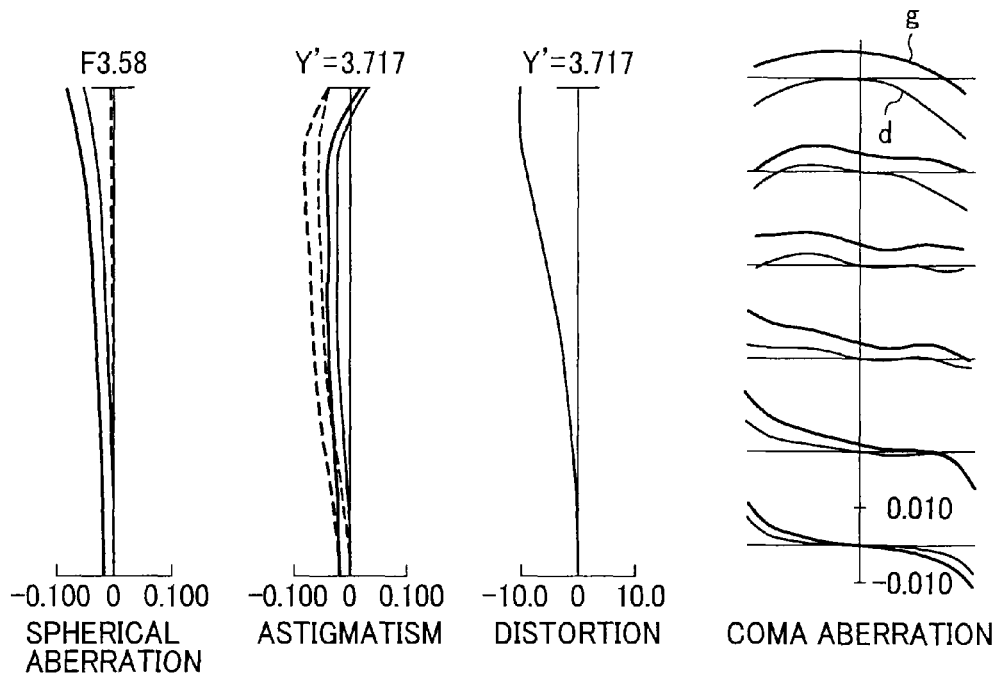
FIG. 6 is a view illustrating aberration curves in the zoom lens according to Example 1 at a wide angle end.
Figure 7:
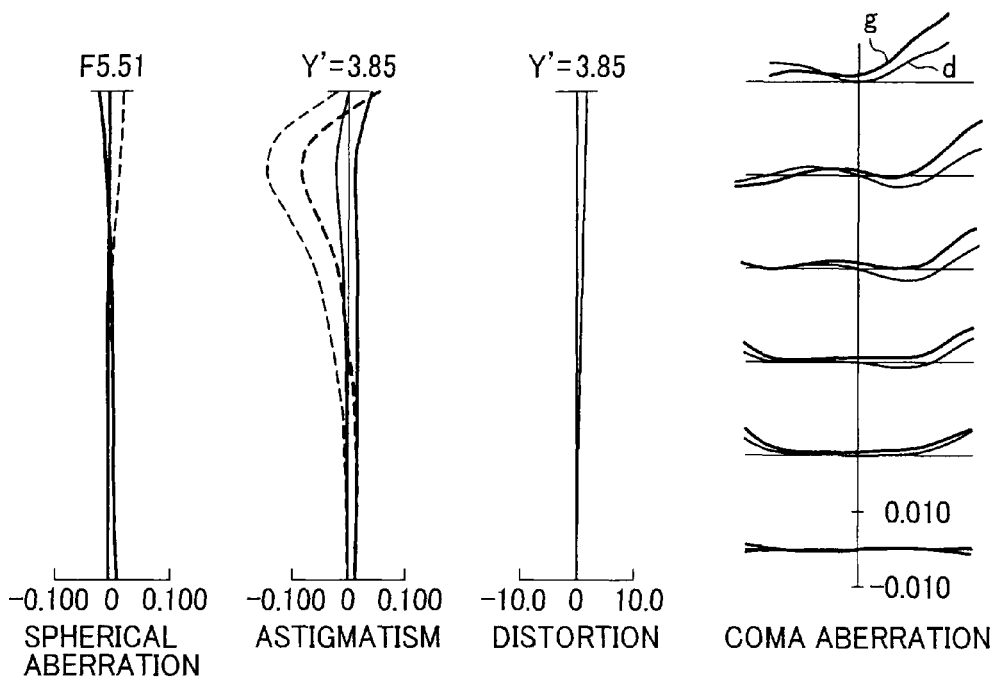
FIG. 7 is a view illustrating aberration curves in the zoom lens according to Example 1 at an intermediate focal length position.
Figure 8:
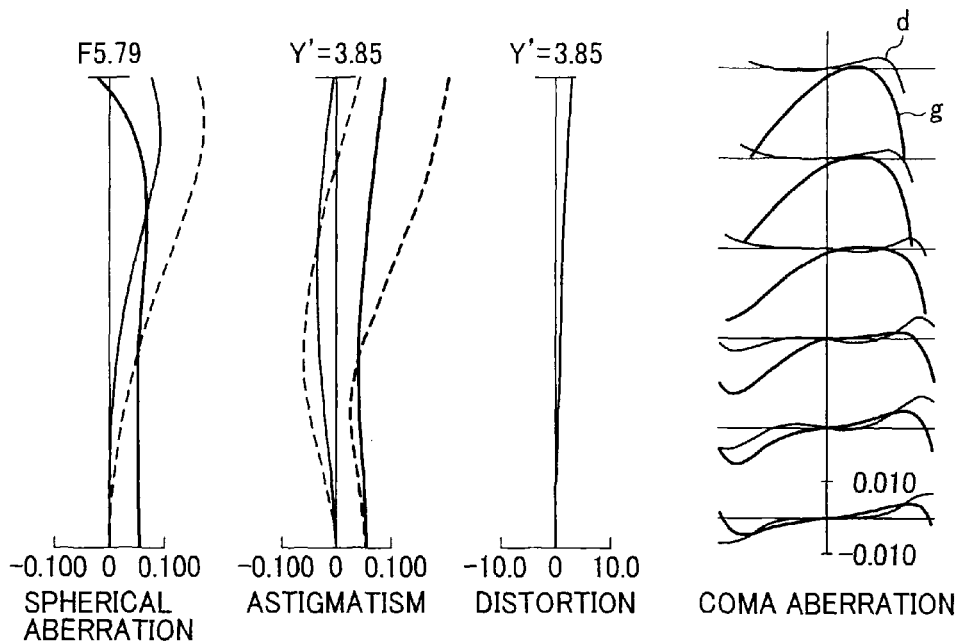
FIG. 8 is a view illustrating aberration curves in the zoom lens according to Example 1 at a telephoto end.
Figure 9:
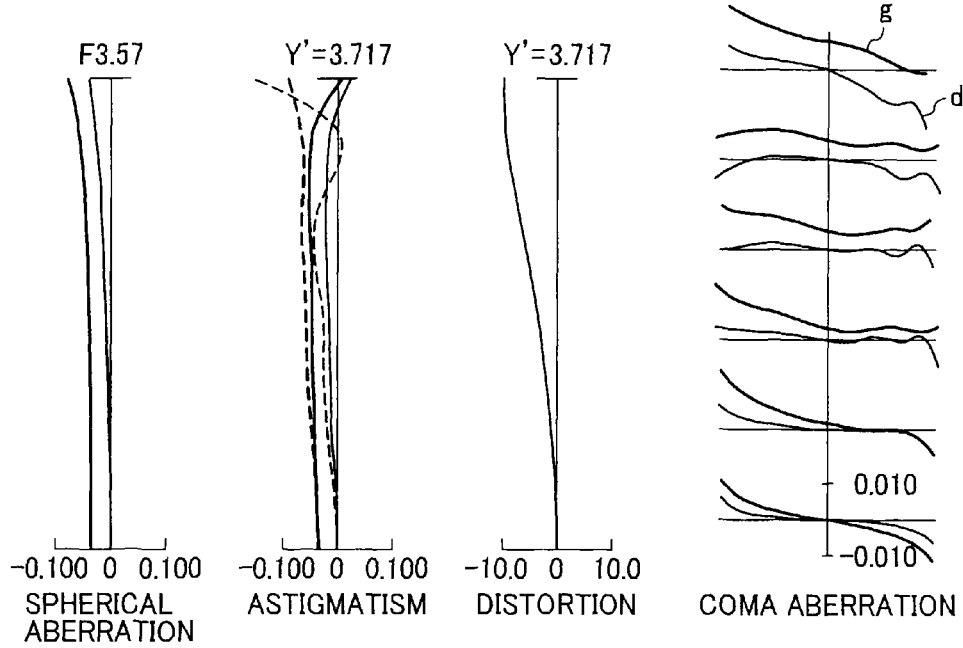
FIG. 9 is a view illustrating aberration curves in the zoom lens according to Example 2 at the wide angle end.
Figure 12:
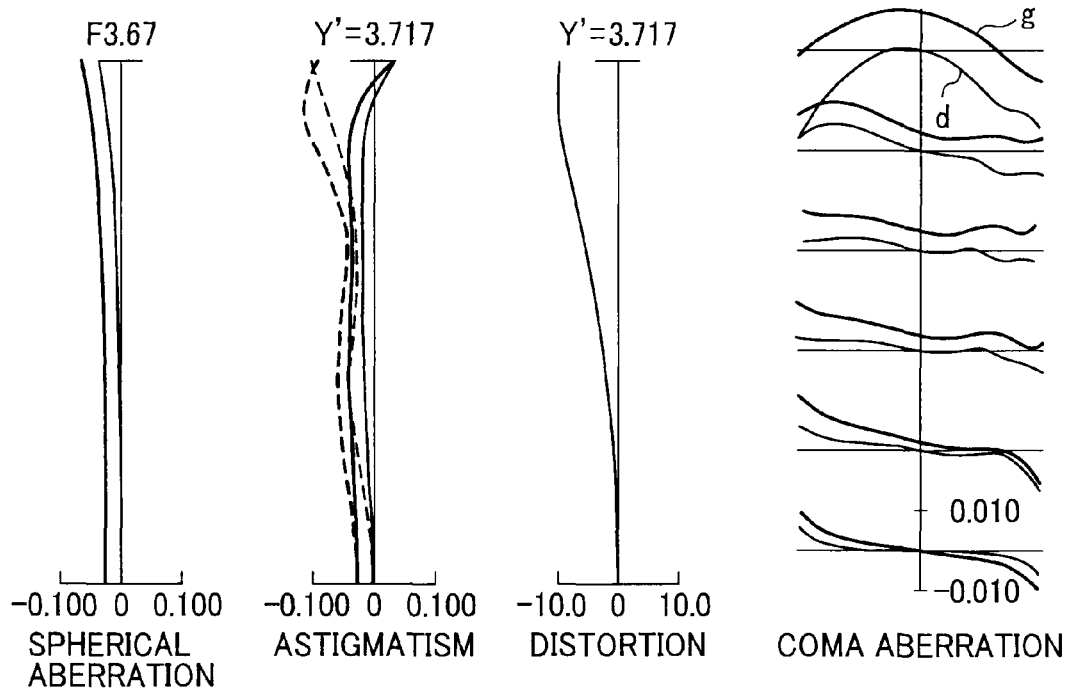
FIG. 12 is a view illustrating aberration curves in the zoom lens according to Example 3 at the wide angle end.
Figure 13:
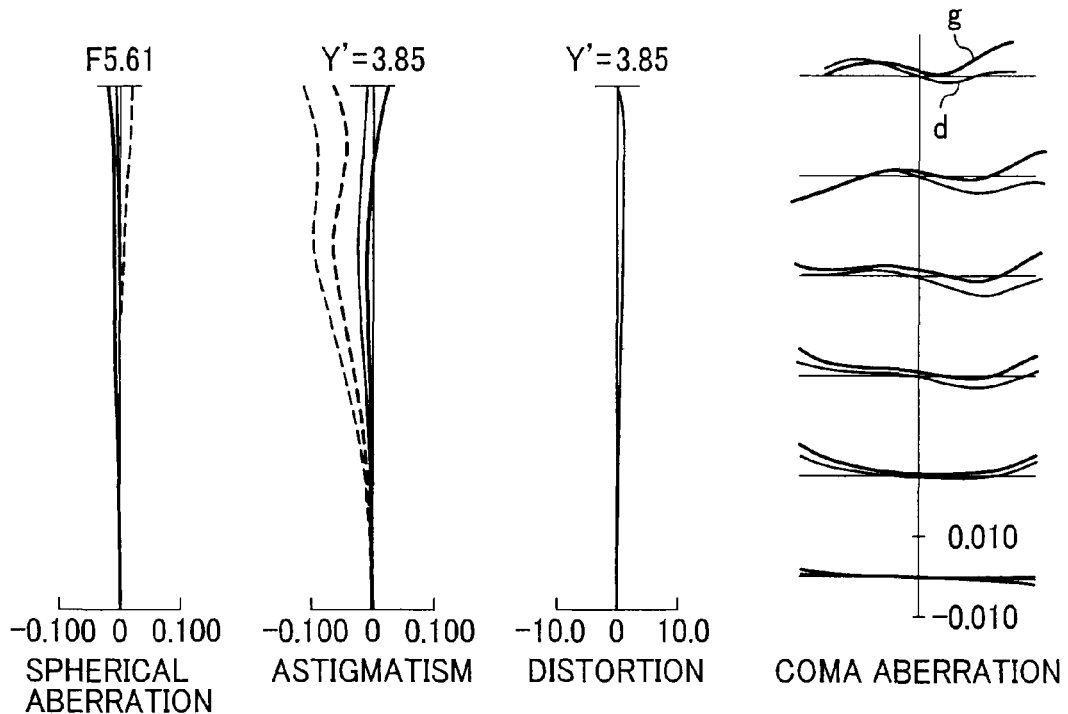
FIG. 13 is a view illustrating aberration curves in the zoom lens according to Example 3 at the intermediate focal length position.
Figure 14:
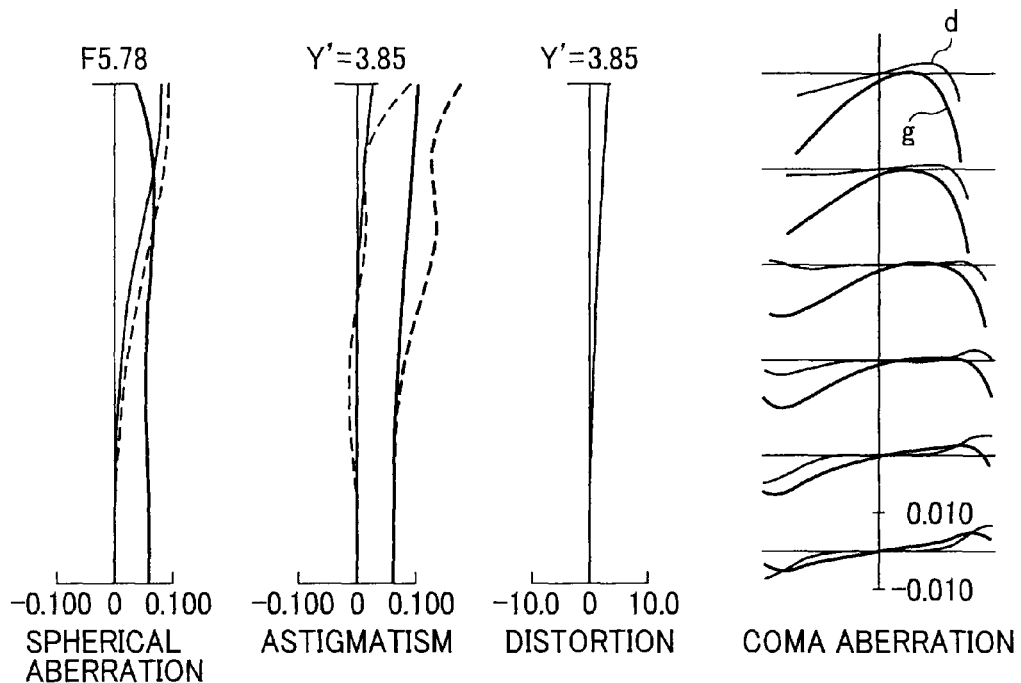
FIG. 14 is a view illustrating aberration curves in the zoom lens according to Example 3 at the telephoto end.

FIGS. 6, 7 and 8 show aberration curves of Example 1 at the wide angle end, the intermediate focal length position and the telephoto end, respectively. FIGS. 9, 10 and 11 show aberration curves of Example 2 at the wide angle end, the intermediate focal length position and the telephoto end, respectively. FIGS. 12, 13 and 14 show aberration curves of Example 3 at the wide angle end, the intermediate focal length position and the telephoto end, respectively.

Figure 15:
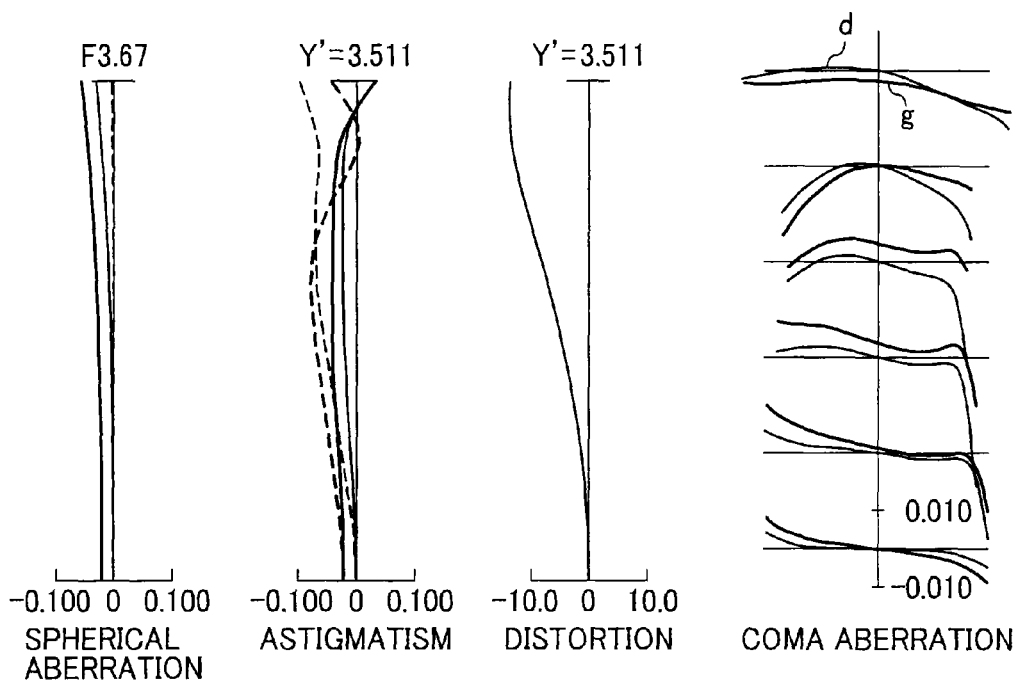
FIG. 15 is a view illustrating aberration curves in the zoom lens according to Example 4 at the wide angle end.
Figure 16:
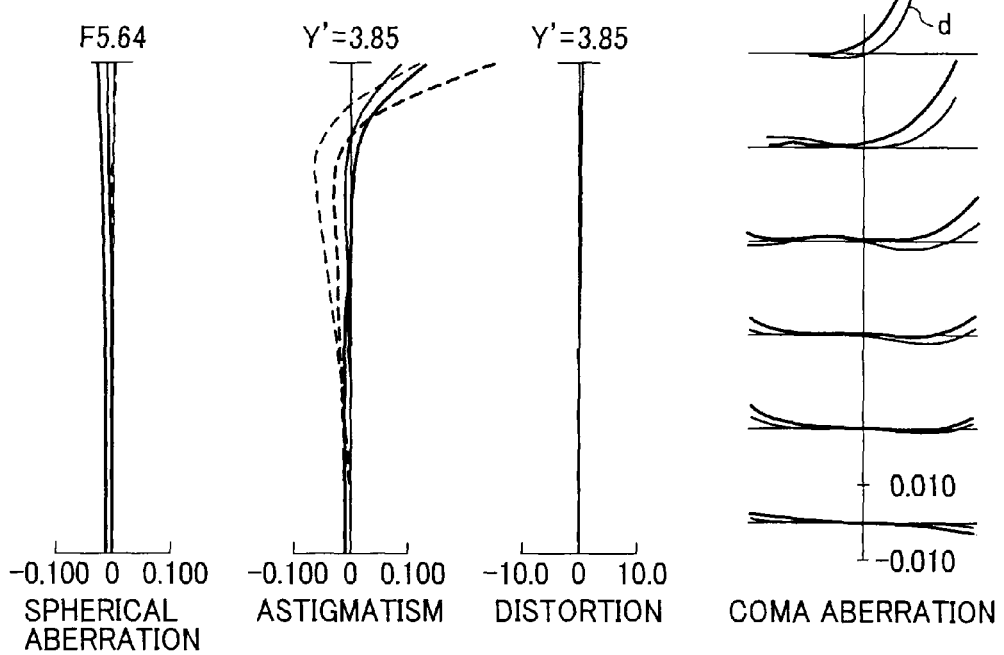
FIG. 16 is a view illustrating aberration curves in the zoom lens according to Example 4 at the intermediate focal length position.
Figure 17:
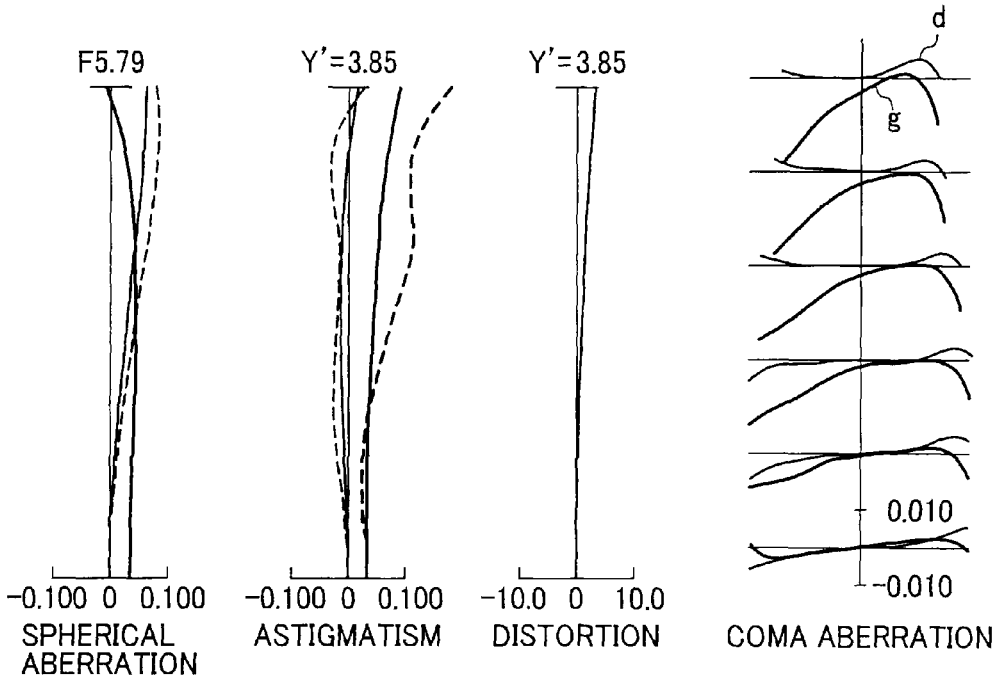
FIG. 17 is a view illustrating aberration curves in the zoom lens according to Example 4 at the telephoto end.
Figure 18:
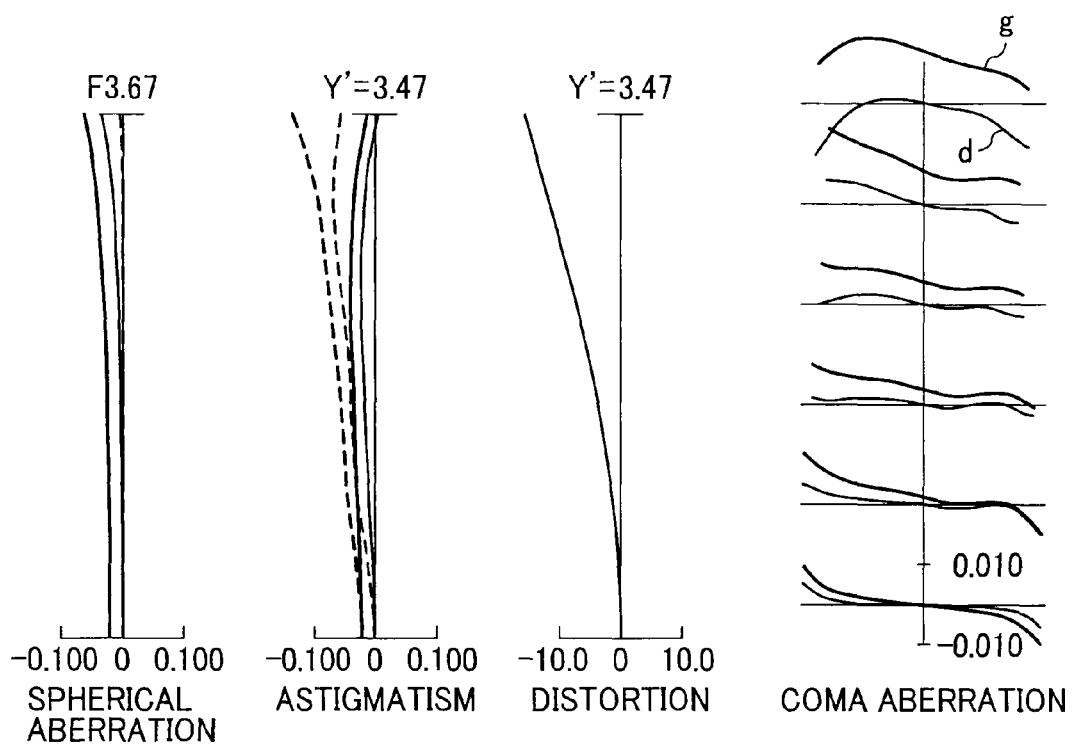
FIG. 18 is a view illustrating aberration curves in the zoom lens according to Example 5 at the wide angle end.
Figure 19:
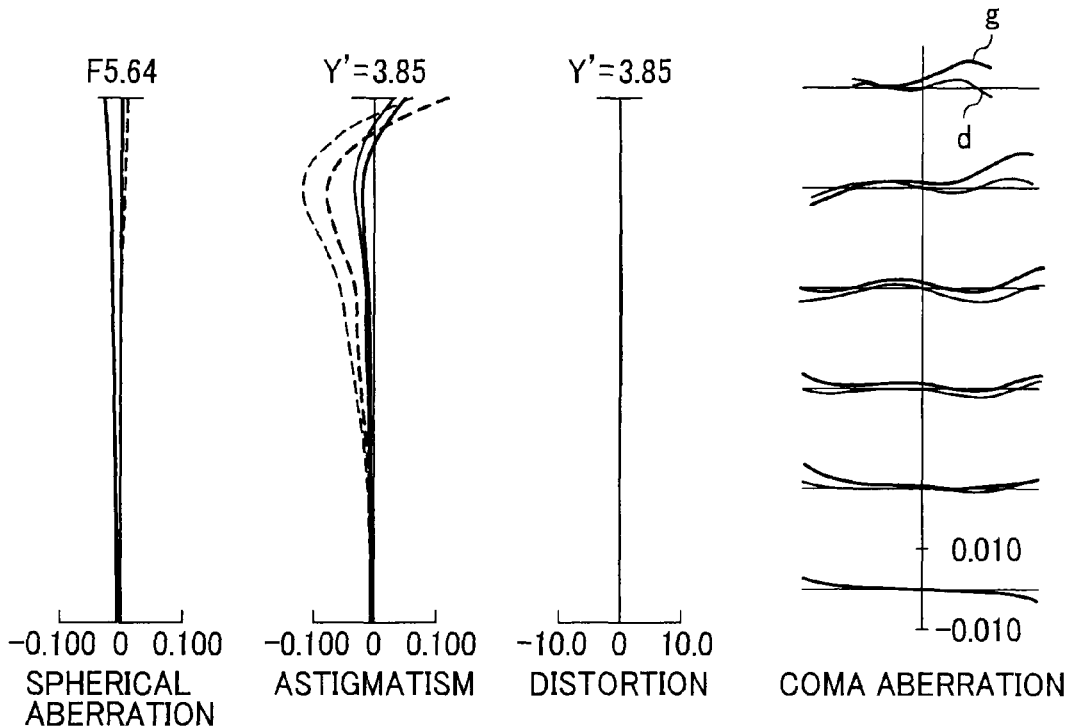
FIG. 19 is a view illustrating aberration curves in the zoom lens according to Example 5 at the intermediate focal length position.
Figure 20:
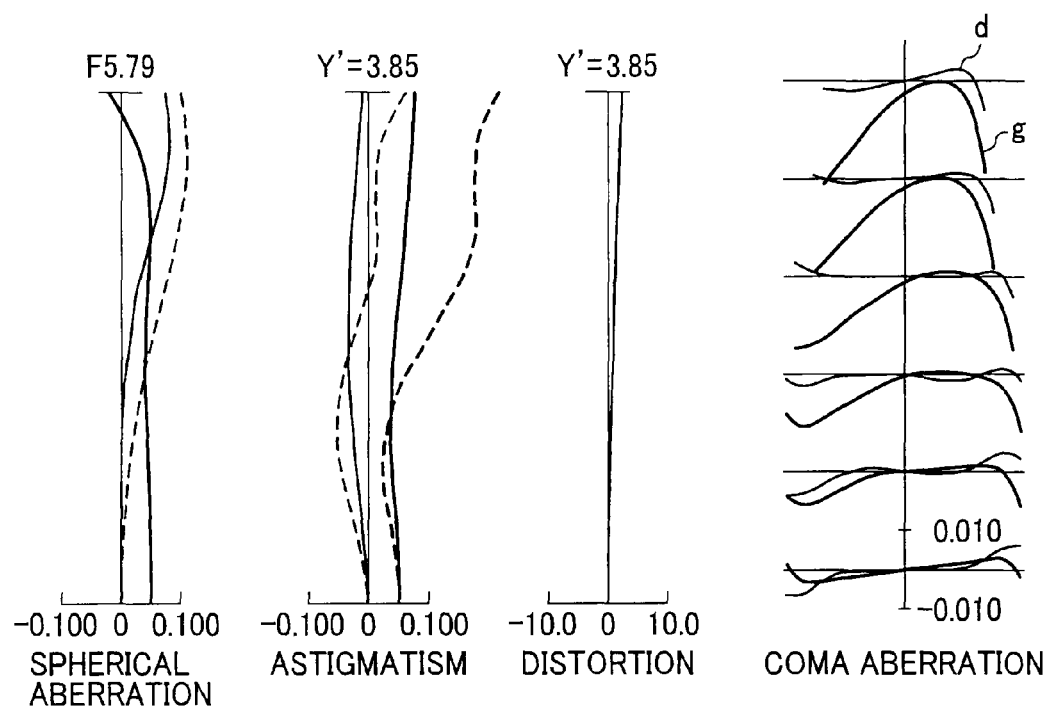
FIG. 20 is a view illustrating aberration curves in the zoom lens according to Example 5 at the telephoto end.

FIGS. 15, 16 and 17 show aberration curves of Example 4 at the wide angle end, the intermediate focal length position and the telephoto end, respectively. FIGS. 18, 19 and 20 show aberration curves of Example 5 at the wide angle end, the intermediate focal length position and the telephoto end, respectively.

In the aberration curves, the broken line in the spherical aberration indicates a sine condition, and in astigmatism curves, the solid line indicates a sagittal image plane and the broken line indicates a meridional image plane. In these aberration curves, a heavy solid line indicates aberration in a section along the meridional image plane for g line, a heavy broken line indicates aberration in a section along the sagittal image plane, a solid line indicates aberration in a section along the meridional image plane for d line, and a broken line indicates aberration in a section along the sagittal image plane for d line.

The aberration in each Example is sufficiently corrected and the zoom lens can be used for a light receiving device having 10 to 15 million pixels. By the configuration of the zoom lens, it is clearly shown in Examples that sufficiently small size and high image performance can be achieved.

[Second Embodiment]

The zoom lens according to a second embodiment of the present invention includes a first lens group having a positive refractive power, a second lens group having a negative refractive power, a third lens group having a positive refractive power, and a fourth lens group having a positive power, which are disposed in order from an object side to an image side, and an aperture stop disposed between the second lens group and the third lens group.

Each lens group is independently moved when changing the magnification of the zoom lens.

The first lens group and the third lens group are set at the telephoto end to positions which are at object sides of positions at the wide angle end, respectively.

The first lens group includes two lenses, that is, a negative meniscus lens having a convex surface at an object side and a positive lens having a convex surface at an object side, which are disposed in order from the object side.

The second lens group includes three lenses, that is, a biconcave negative lens which has at least one aspheric surface and has a surface having a larger refractive power at an image side than an object side, a negative lens having a concave surface at an image side, and a positive lens having a convex surface at an object side, which are disposed in order from the object side.

The following condition is satisfied:

$$0.3<|(\beta 2t/\beta 2w)/(ft/fw)|<0.8 \quad (11)$$

where β2w is an imaging magnification of the second lens group at the wide angle end, fw is a focal length of the zoom lens at the wide angle end, and ft is a focal length of the zoom lens at the telephoto end.

In the zoom lens, the following condition is preferably satisfied:

$$5.0<f1/fw<8.0 \quad (12)$$

where f1 is a focal length of the first lens group.

In the zoom lens, the biconcave negative lens disposed at the most object side in the second lens group preferably has both-sided aspheric surfaces.

In the zoom lens, the following conditions are preferably satisfied:

$$0.025<\Delta\theta gf23 \quad (13)$$

$$1.8<N23 \quad (14)$$

where Δθgf23 is a anomalous dispersion property and N23 is a refractive index of a lens material of a most image side positive lens of the second lens group for d line.

A partial dispersion ratio θgF is defined by the following formula:

$$\theta gF=(ng-nF)/(nF-nC)$$

where ng is a refractive index for g line, nF is a refractive index for F line, and nC is a refractive index for C line in Fraunhofer lines.

In a two-dimensional coordinate in which a vertical axis indicates θgF and a horizontal axis indicate an Abbe number νd, a line connecting a coordinate point of a standard glass type K7 (νd=60.49, θgF=0.5436) with a coordinate point of a standard glass type F2 (νd=36.26, θgF=0.5828) is set as a standard line.

The anomalous dispersion property Δθgf of each glass type is a deviation amount of the partial dispersion ratio of each glass from the standard line in a vertical axis direction in the two-dimensional coordinate.

"23" of the anomalous dispersion property Δθgf23 in the condition (14) means a positive lens, which is a third lens from the object side in the second lens group.

The anomalous dispersion property is "positive" when the partial dispersion ratio θgF of the glass material is at an upper side of the reference line (at a plus side in the vertical axis) in the above two-dimensional coordinate and "negative" when the partial dispersion ratio θgF of the glass material is at a lower side of the reference line.

In the zoom lens, the third lens group preferably has a positive lens, a positive lens, and a negative lens, which are disposed in order from the object side. The fourth lens group is preferably a single positive lens and has at least one aspheric surface.

The following condition is preferably satisfied:

$$11>ft/fw>9.0 \quad (15)$$

An Information device according to an embodiment of the present invention includes a photographing function by use of the zoom lens as a photographing optical system. In the zoom lens, a subject image through the zoom lens may be imaged on a light receiving surface of the image pickup device. A mobile information terminal apparatus according to an embodiment of the present invention has a photographing function device having the zoom lens as a photographing apparatus.

As a supplementary explanation, in order to achieve a small size, highly variable magnification, and high performance, it is necessary to set an appropriate refractive power of each lens group or appropriately set a lens configuration in each lens group is required.

At the telephoto end, the position of the first lens group is set at the object side of the position at the wide angle end so that an image of the first lens group, which is an object for the second lens group, can be moved closer to the second lens group to improve the magnification ratio.

Furthermore, the entire length of the optical system at the wide angle end is reduced so that a time required for the lens barrel to extend when the camera is actuated is reduced. In addition, the entire length of the optical system at the telephoto end is elongated so that degradation in performance due to decentering or eccentricity of each lens group can be suppressed.

Considering that the first lens group and the second lens group are moved as described above and extending amount of the fourth lens group is reduced, the position of the third lens group at the telephoto end is preferably set to a position at an object side of the position thereof at the wide angle end.

In the zoom lens, the second lens group has a function as a main magnification lens group and therefore is an important lens group.

The condition (11) shows a burden share of the magnification of the second lens group as the main magnification lens group, that is, a proportion of β2t/β2w, which is a ratio of an imaging magnification of the second lens group at the telephoto end to that at the wide angle end, to ft/fw, which is the magnification ratio shown as a denominator of the parameter of the condition (11).

When the parameter of the condition (11) is decreased, it means that the magnification function which is shared by the second lens group is reduced. If the value of the condition (11) is reduced to be less than the lower limit and therefore the burden share of the second lens group becomes too small, the movement amount of the other lens group is required to be large so as to acquire a high magnification so that the entire length of the zoom lens is possibly increased and it is possibly difficult to achieve small size zoom lens.

On the contrary, if the value of the condition (11) is increased to be more than the upper limit and therefore the burden share of the magnification of the second lens group becomes too large, the refractive power of the second lens group is required to be large so that it is possible to require high assembling accuracy. Furthermore, the movement amount of the second lens group when changing the magnification becomes too large so that the entire length of the zoom lens is possibly increased.

The parameter of the condition (11) more preferably satisfies the following condition (11A) which has a more narrow range.

$$0.35 < |(\beta 2t/\beta 2w)/(ft/fw)| < 0.55 \quad (11A)$$

The condition (12) is a condition relating to the first lens group to control a balance of a power of the first lens group relative to the entire system at the wide angle end.

If the parameter f1/fw of the condition (12) is less than the lower limit: 5.0, the positive power of the first lens group is relatively increased to cause a generated amount of the aberration to be excessively increased so that especially a field curvature or a distortion is largely generated and therefore it is possibly difficult to correct each aberration.

On the contrary, if the parameter f1/fw of the condition (12) is more than the upper limit 8.0, the refractive power of the first lens group is relatively decreased and therefore there is advantage in the aberration correction. However, a front lens diameter of the first lens group or a size when the zoom lens is in a collapsed state is increased so that it is possible that the compact zoom lens cannot be achieved.

The most object side lens in the second lens group may be a biconcave lens and, in this configuration, a first surface of the second group having a negative power as a whole is a concave surface at the object side.

Thereby, more largely negative power can be affected for a light flux at a high position in the second lens group.

In addition, in the second lens group having the negative power as a whole, the first surface in which a light flux of each field angle is most separated from each other is a concave surface at the object side so that the small diameter of the third lens group can be effectively achieved.

Since the small diameter of the third lens group is achieved, it has effect directly for a small volume or a lightweight of the entire optical system. In addition, if the third lens group is a lens group configured to be retracted from a position on an optical axis when the zoom lens is collapsed, there are effects for conserving a space where the third lens group is retracted or a low load when the third lens group is retracted.

The biconcave negative lens disposed at the most object side in the second lens group has an aspheric surface at both sides and thereby, a number of lenses in the second lens group can be reduced. Therefore, the aspheric surfaces are provided in a single lens so that a broader choice of a glass type employed for the other lens can be achieved and therefore there is advantage in the aberration correction.

According to the conditions (13) and (14), it is possible especially to successfully correct chromatic aberration of magnification which is increased at the telephoto end and chromatic aberration on axis.

If the parameters of the conditions (13) and (14) are less than the lower limits, respectively, the anomalous dispersion property of the positive lens disposed at the most image side in the second lens group is insufficient so that it is possibly difficult to correct the chromatic aberration of magnification and chromatic aberration on axis.

Furthermore, if the value of the condition (14) is less than the lower limit, it is required to maintain the positive refractive power of the positive lens to have a reduced curvature radius of a lens surface and then the thickness of the lens is increased so that reduction of the entire zoom lens size is possibly inhibited.

The third lens group may be configured by three-lens configuration including the positive lens, the positive lens, and the negative lens so that even in the zoom lens having high variable magnification such as more than 8 times of the magnification ratio from the wide angle end to the telephoto end, it is easily possible to successfully correct aberrations, such as the chromatic aberration, and the like at the entire zooming range.

In the zoom lens, when changing the magnification, the first to fourth lens groups are independently moved. The fourth lens group disposed at the most image side may be a single positive lens so that it is possible to simplify a movement mechanism of the fourth lens group and to reduce a required energy for movement and then the fourth lens group may function as a focusing group.

The single positive lens has at least one aspheric surface so that various aberrations which cannot be corrected by the first to third lens groups can be successfully corrected by the aspheric surface of the fourth lens group.

The condition (15) is to control the magnification ratio of the zoom lens and the magnification ratio ranges from 9 to 11 times.

The aspheric surface is shown by the following well known formula:

$$X = CH^2/\{1 + \sqrt{(1+K)C^2H^2)}\} + A4 \cdot H^4 + A6 \cdot H^6 + A8 \cdot H^8 + A10 \cdot H^{10} + A12 \cdot H^{12} + A14 \cdot H^{14} + A16 \cdot H^{16} + A18 \cdot H^{18}$$

where X is a depth or an aspheric amount in a direction of an optical axis, C is an inverse of a paraxial curvature radius (paraxial curvature), H is a height from an optical axis of the zoom lens. The glass types are indicated by optical glass names of OHARA INC. and SUMITA Optical glass INC. A unit of an amount having a dimension in length is "mm" unless it is indicated that other unit is used.

EXAMPLE 6

Figure 21:
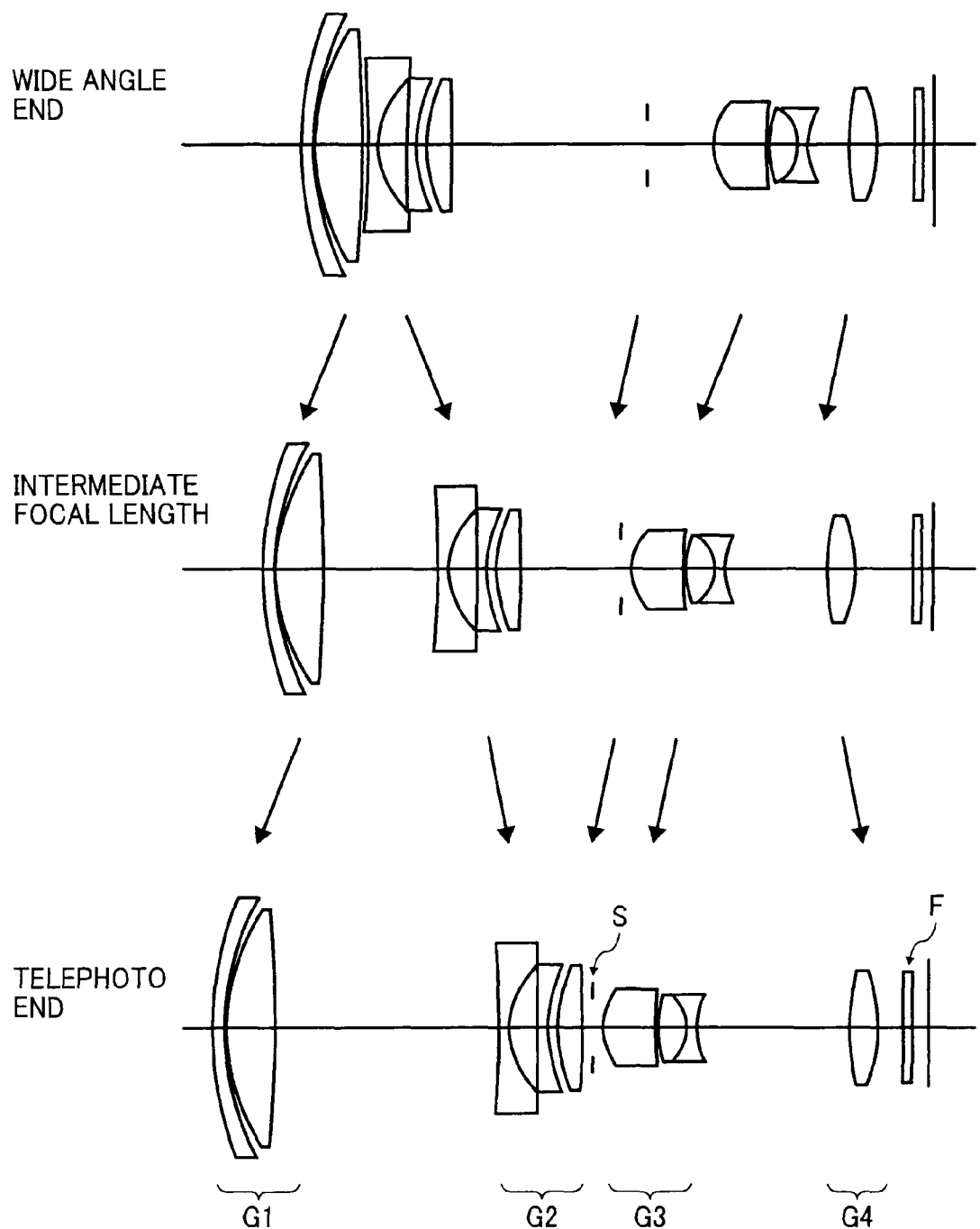
FIG. 21 is a view showing a lens configuration of the zoom lens according to Example 6.

Example 6 is a specific example of the zoom lens shown in FIG. 21.

| Focal length | W: 5.04 | T: 51.99 |
| Half Angle of Field | W: 39.38 | T: 4.25 |
| Fno. | W: 3.67 | T: 5.79 |

Hereinafter, "W" means the wide angle end and "T" means the telephoto end.

Data of Example 6 is as follows.

| SURFACE NO. | R | D | Nd | vd | GLASS TYPE |
|---|---|---|---|---|---|
| 1 | 29.37 | 0.95 | 1.92286 | 18.9 | S-NPH2 |
| 2 | 21.552 | 0.1 | | | |
| 3* | 16.077 | 3.95 | 1.58913 | 61.15 | L-BAL35 |
| 4* | −119.235 | VARIABLE(A) | | | |
| 5* | −52.668 | 0.8 | 1.864 | 40.58 | L-LAH83 |
| 6* | 6.173 | 2.4 | | | |
| 7 | ∞ | 0.8 | 1.72 | 46.02 | S-LAM61 |
| 8 | 11.508 | 0.79 | | | |
| 9 | 11.756 | 2.03 | 1.80809 | 22.76 | S-NPH1 |
| 10 | −187.599 | VARIABLE(B) | | | |
| 11 | APERTURE STOP | VARIABLE(C) | | | |
| 12* | 4.717 | 4.44 | 1.497 | 81.5 | K-PFK80 |
| 13* | −36.809 | 0.11 | | | |
| 14 | 8.194 | 2.45 | 1.6223 | 53.17 | S-BSM22 |
| 15 | −3.5 | 0.8 | 1.834 | 37.16 | S-LAH60 |
| 16 | 5.509 | VARIABLE(D) | | | |
| 17* | 25.213 | 2.26 | 1.51633 | 64.06 | L-BSL7 |
| 18 | −13.357 | 1 | | | |
| 19 | ∞ | 0.28 | 1.5377 | 66.6 | FILTER |
| 20 | ∞ | 0.5 | 1.5 | 64 | FILTER |

[Variable Amount]

Data on variable amounts of Example 6 is as follows.

| | Wide Angle End | Intermediate | Telephoto End |
|---|---|---|---|
| Variable(A) | 0.5035 | 9.5547 | 18.4545 |
| Variable(B) | 16.1166 | 8.3662 | 0.8595 |
| Variable(C) | 5.5311 | 0.95 | 0.8905 |
| Variable(D) | 3.4181 | 8.5438 | 12.607 |

[Aspheric Surface]

Data on the aspheric surfaces of Example 6 is as follows.

| | K | A4 | A6 | A8 |
|---|---|---|---|---|
| 3rd | −0.22318 | −6.02869E−06 | −6.35411E−08 | 8.92694E−10 |
| 4th | 0 | 4.74802E−06 | −9.56913E−09 | −1.36638E−10 |
| 5th | 0 | 1.38189E−05 | 4.89240E−06 | −1.24277E−07 |
| 6th | −0.68781 | 0 | 6.57098E−07 | 1.11012E−06 |
| 12th | 0.03139 | −1.98053E−04 | 4.40551E−06 | −5.84010E−07 |
| 13th | −20.89232 | 1.08768E−03 | 4.50485E−05 | −1.25614E−06 |
| 17th | 0.62834 | −6.35239E−05 | 1.60147E−05 | −1.05906E−06 |

| | A10 | A12 | A14 |
|---|---|---|---|
| 3rd | −1.41736E−11 | 8.72492E−14 | −1.07231E−16 |
| 4th | 1.64069E−13 | 1.21670E−14 | 0 |
| 5th | 5.86544E−10 | 1.60870E−11 | −1.84141E−13 |
| 6th | −4.68597E−08 | 4.25430E−10 | 4.40887E−12 |
| 12th | 5.69118E−08 | −7.81240E−10 | 0 |
| 13th | 3.57716E−07 | −2.91641E−11 | 0 |
| 17th | 3.74275E−08 | −5.48963E−10 | 7.06060E−14 |

[Values of Parameters in Conditions]
Values of parameters in the conditions are as follows.

| Condition | Calculated Results |
|---|---|
| (11) | 0.45 |
| (12) | 6.62 |
| (13) | 0.0261 |
| (14) | 1.81 |
| (15) | 10.31 |

EXAMPLE 7

Figure 25:
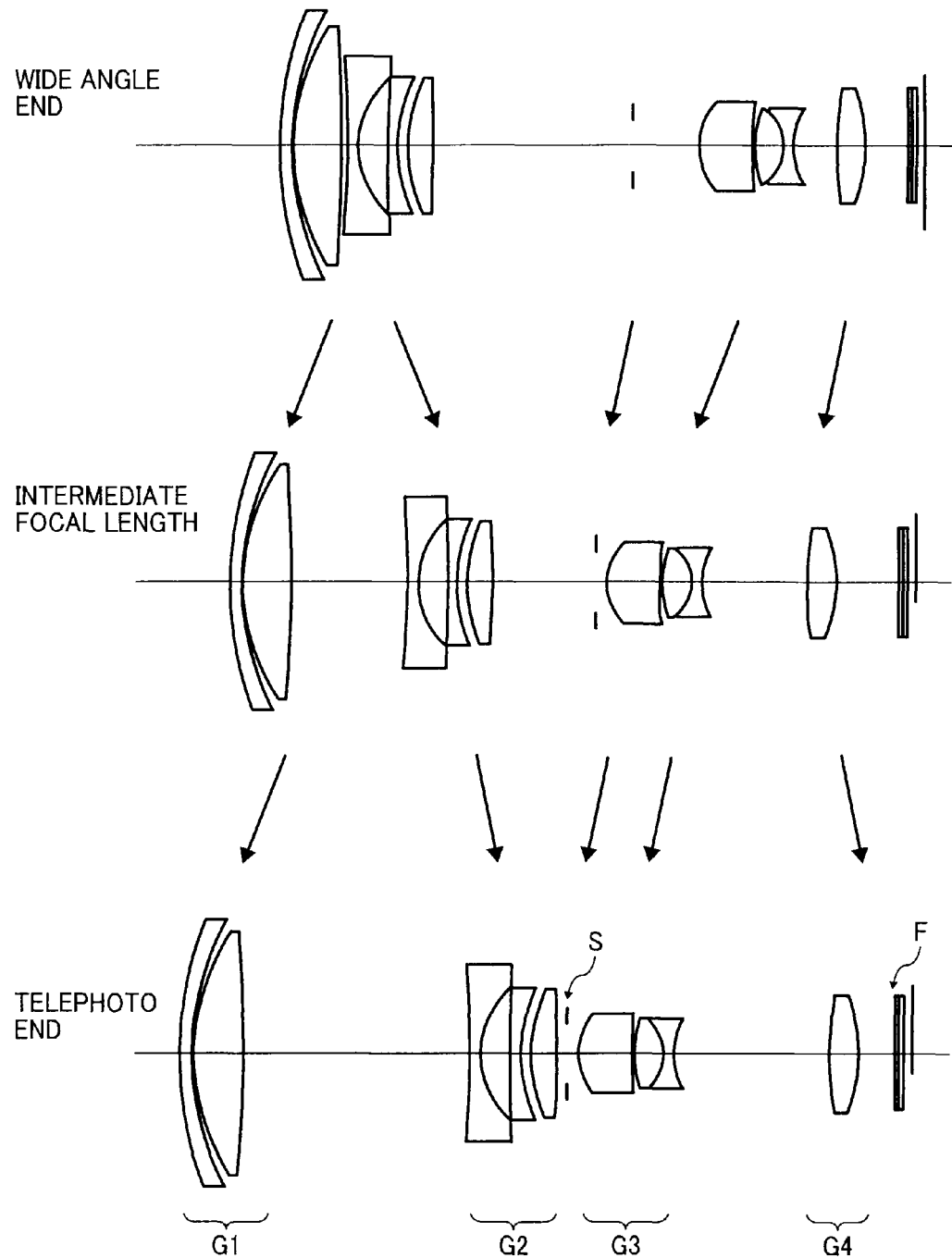
FIG. 25 is a view showing a lens configuration of the zoom lens according to Example 7.

Example 7 is a specific example of the zoom lens shown in FIG. 25.

| Focal length | W: 5.05 | T: 51.95 |
|---|---|---|
| Half Angle of Field | W: 39.38 | T: 4.25 |
| Fno. | W: 3.68 | T: 5.79 |

Data of Example 7 is as follows.

| SURFACE NO. | R | D | Nd | vd | GLASS TYPE |
|---|---|---|---|---|---|
| 1 | 29.289 | 0.95 | 1.92286 | 18.9 | S-NPH2 |
| 2 | 21.502 | 0.1 | | | |
| 3* | 16.003 | 3.95 | 1.58913 | 61.15 | L-BAL35 |
| 4* | −123.048 | VARIABLE(A) | | | |
| 5* | −56.683 | 0.8 | 1.864 | 40.58 | L-LAH83 |
| 6* | 6.173 | 2.42 | | | |
| 7 | ∞ | 0.8 | 1.7331 | 48.89 | L-LAM72 |
| 8 | 11.956 | 0.82 | | | |
| 9 | 11.987 | 1.98 | 1.80809 | 22.76 | S-NPH1 |
| 10 | −251.412 | VARIABLE(B) | | | |
| 11 | APERTURE STOP | VARIABLE(C) | | | |
| 12* | 4.714 | 4.43 | 1.497 | 81.5 | K-PFK80 |
| 13* | −37.102 | 0.1 | | | |
| 14 | 8.178 | 2.45 | 1.6223 | 53.17 | S-BSM22 |
| 15 | −3.487 | 0.8 | 1.834 | 37.16 | S-LAH60 |
| 16 | 5.547 | VARIABLE(D) | | | |
| 17* | 26.925 | 2.28 | 1.51633 | 64.06 | L-BSL7 |
| 18 | −12.702 | 1 | | | |
| 19 | ∞ | 0.28 | 1.5377 | 66.6 | FILTER |
| 20 | ∞ | 0.5 | 1.5 | 64 | FILTER |

[Variable Amount]
Data on variable amounts of Example 7 is as follows.

| | Wide Angle End | Intermediate | Telephoto End |
|---|---|---|---|
| Variable(A) | 0.5 | 9.5545 | 18.440 |
| Variable(B) | 16.0177 | 8.3328 | 0.8004 |
| Variable(C) | 5.3762 | 0.95 | 0.9496 |
| Variable(D) | 3.4156 | 8.6822 | 12.6154 |

[Aspheric Surface]
Data on the aspheric surfaces of Example 7 is as follows.

| | K | A4 | A6 | A8 |
|---|---|---|---|---|
| 3rd | −0.22167 | −5.90530E−06 | −6.46727E−08 | 8.93729E−10 |
| 4th | 0 | 4.85871E−06 | −9.30655E−09 | −1.34840E−10 |
| 5th | 0 | 1.32968E−05 | 4.71545E−06 | −1.24885E−07 |
| 6th | −0.65707 | 0 | −8.68916E−09 | 1.10389E−06 |
| 12th | 0.03132 | −1.97751E−04 | 5.10296E−06 | −5.70008E−07 |
| 13th | −18.1434 | 1.08465E−03 | 4.80974E−05 | −1.41912E−06 |
| 17th | −2.23963 | −8.00366E−05 | 1.66391E−05 | −1.06996E−06 |

| | A10 | A12 | A14 |
|---|---|---|---|
| 3rd | −1.40797E−11 | 8.87033E−14 | −8.66730E−17 |
| 4th | 3.09988E−13 | 1.45501E−14 | 0 |
| 5th | 6.15346E−10 | 1.62349E−11 | −1.85528E−13 |
| 6th | −4.70424E−08 | 4.31029E−10 | 4.30512E−12 |
| 12th | 5.49994E−08 | −7.81240E−10 | 0 |
| 13th | 3.46338E−07 | −2.91641E−11 | 0 |
| 17th | 3.72144E−08 | −5.36891E−10 | 7.06060E−14 |

[Values of Parameters in Conditions]
Values of parameters in the conditions are as follows.

| Condition | Calculated Results |
|---|---|
| (11) | 0.45 |
| (12) | 6.61 |
| (13) | 0.0261 |
| (14) | 1.81 |
| (15) | 10.29 |

EXAMPLE 8

Figure 29:
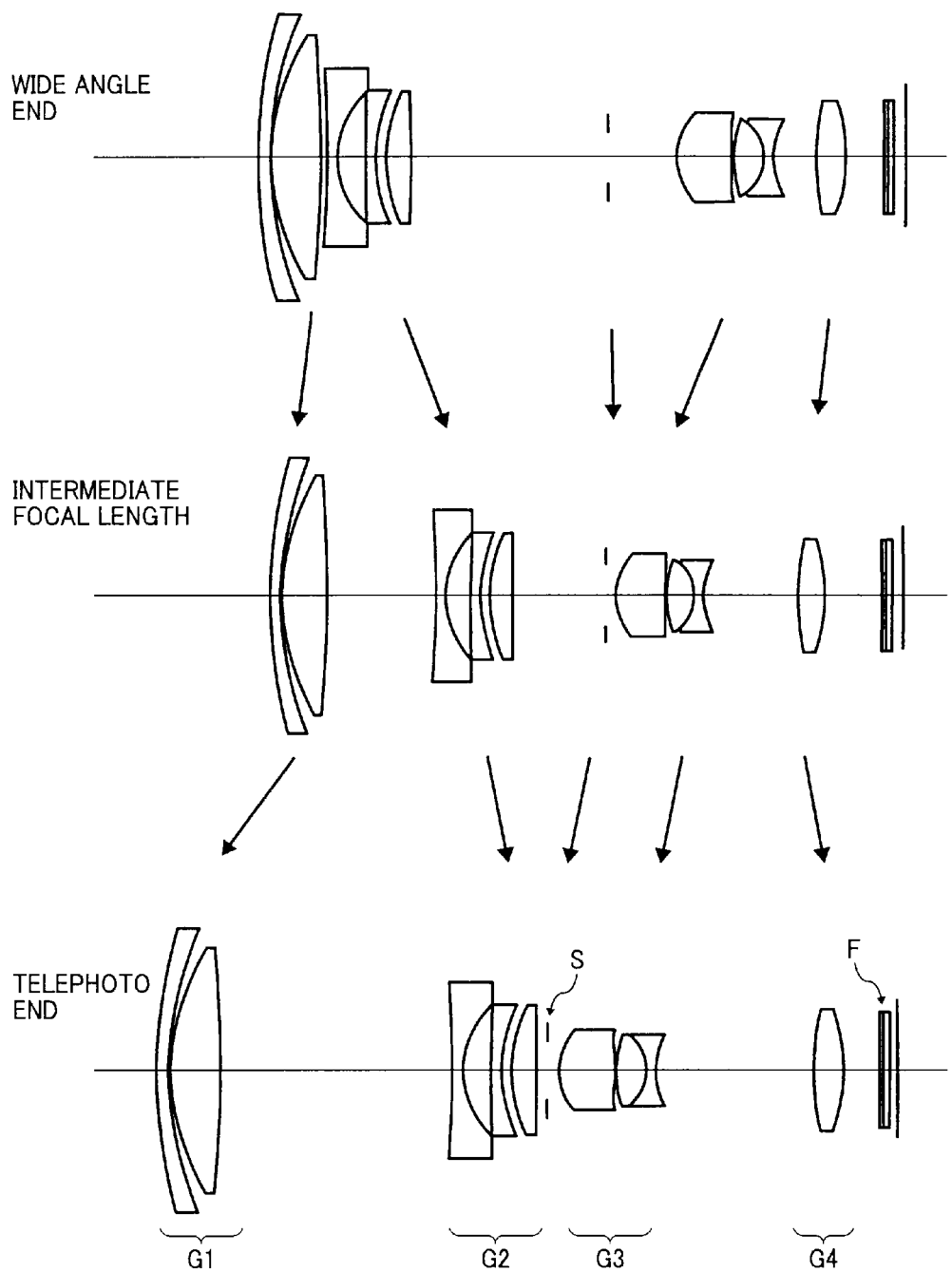
FIG. 29 is a view showing a lens configuration of the zoom lens according to Example 8.

Example 8 is a specific example of the zoom lens shown in FIG. 29.

| | | |
|---|---|---|
| Focal length | W: 5.05 | T: 51.97 |
| Half Angle of Field | W: 39.38 | T: 4.27 |
| Fno. | W: 3.67 | T: 5.79 |

Data of Example 8 is as follows.

| SURFACE NO. | R | D | Nd | vd | GLASS TYPE |
|---|---|---|---|---|---|
| 1 | 40.056 | 0.95 | 1.92286 | 18.9 | S-NPH2 |
| 2 | 26.967 | 0.1 | | | |
| 3* | 16.685 | 3.95 | 1.58913 | 61.15 | L-BAL35 |
| 4* | −90.74 | VARIABLE(A) | | | |
| 5* | −54.859 | 0.8 | 1.864 | 40.58 | L-LAH83 |
| 6* | 6.173 | 2.31 | | | |
| 7 | ∞ | 0.8 | 1.7331 | 48.89 | L-LAM72 |
| 8 | 11.615 | 0.82 | | | |
| 9 | 11.785 | 1.98 | 1.80809 | 22.76 | S-NPH1 |
| 10 | −208.09 | VARIABLE(B) | | | |
| 11 | APERTURE STOP | VARIABLE(C) | | | |
| 12* | 4.67 | 4.44 | 1.497 | 81.5 | K-PFK80 |
| 13* | −36.234 | 0.1 | | | |
| 14 | 8.341 | 2.45 | 1.6223 | 53.17 | S-BSM22 |
| 15 | −3.417 | 0.8 | 1.834 | 37.16 | S-LAH60 |
| 16 | 5.558 | VARIABLE(D) | | | |
| 17* | 22.448 | 2.34 | 1.51633 | 64.06 | L-BSL7 |
| 18 | −13.83 | 1 | | | |
| 19 | ∞ | 0.28 | 1.5377 | 66.6 | FILTER |
| 20 | ∞ | 0.5 | 1.5 | 64 | FILTER |

[Variable Amount]
Data on variable amounts of Example 8 is as follows.

| | Wide Angle End | Intermediate | Telephoto End |
|---|---|---|---|
| Variable(A) | 0.5 | 9.6019 | 18.5072 |
| Variable(B) | 15.665 | 8.0743 | 0.8 |
| Variable(C) | 5.574 | 0.95 | 0.95 |
| Variable(D) | 3.4089 | 8.326 | 12.5939 |

[Aspheric Surface]
Data on the aspheric surfaces of Example 8 is as follows.

| | K | A4 | A6 | A8 |
|---|---|---|---|---|
| 3rd | −0.22864 | −6.59143E−06 | −5.89327E−08 | 9.80393E−10 |
| 4th | 0 | 8.39710E−06 | −1.96921E−09 | −1.74055E−10 |
| 5th | 0 | 4.30032E−05 | 3.87787E−06 | −1.24416E−07 |
| 6th | −0.62842 | 0 | 3.65072E−06 | 7.88551E−07 |
| 12th | 0.01946 | −2.09000E−04 | 7.24368E−06 | −8.97536E−07 |
| 13th | −25.29385 | 1.10597E−03 | 4.04691E−05 | −4.68999E−07 |
| 17th | 2.74822 | −5.55768E−05 | 1.46355E−05 | −1.00375E−06 |

| | A10 | A12 | A14 |
|---|---|---|---|
| 3th | −1.44226E−11 | 8.23918E−14 | −7.93229E−17 |
| 4th | −1.83097E−13 | 1.38088E−14 | 0 |
| 5th | 8.68854E−10 | 1.57198E−11 | −2.32699E−13 |
| 6th | −3.92675E−08 | 4.62309E−10 | 8.57255E−13 |
| 12th | 6.62496E−08 | −7.81239E−10 | 0 |
| 13th | 2.60289E−07 | −2.91632E−11 | 0 |
| 17th | 3.68836E−08 | −5.58874E−10 | 7.06167E−14 |

[Values of Parameters in Conditions]
Values of parameters in the conditions are as follows.

| Condition | Calculated Results |
|---|---|
| (11) | 0.46 |
| (12) | 6.56 |
| (13) | 0.0261 |
| (14) | 1.81 |
| (15) | 10.30 |

EXAMPLE 9

Figure 33:
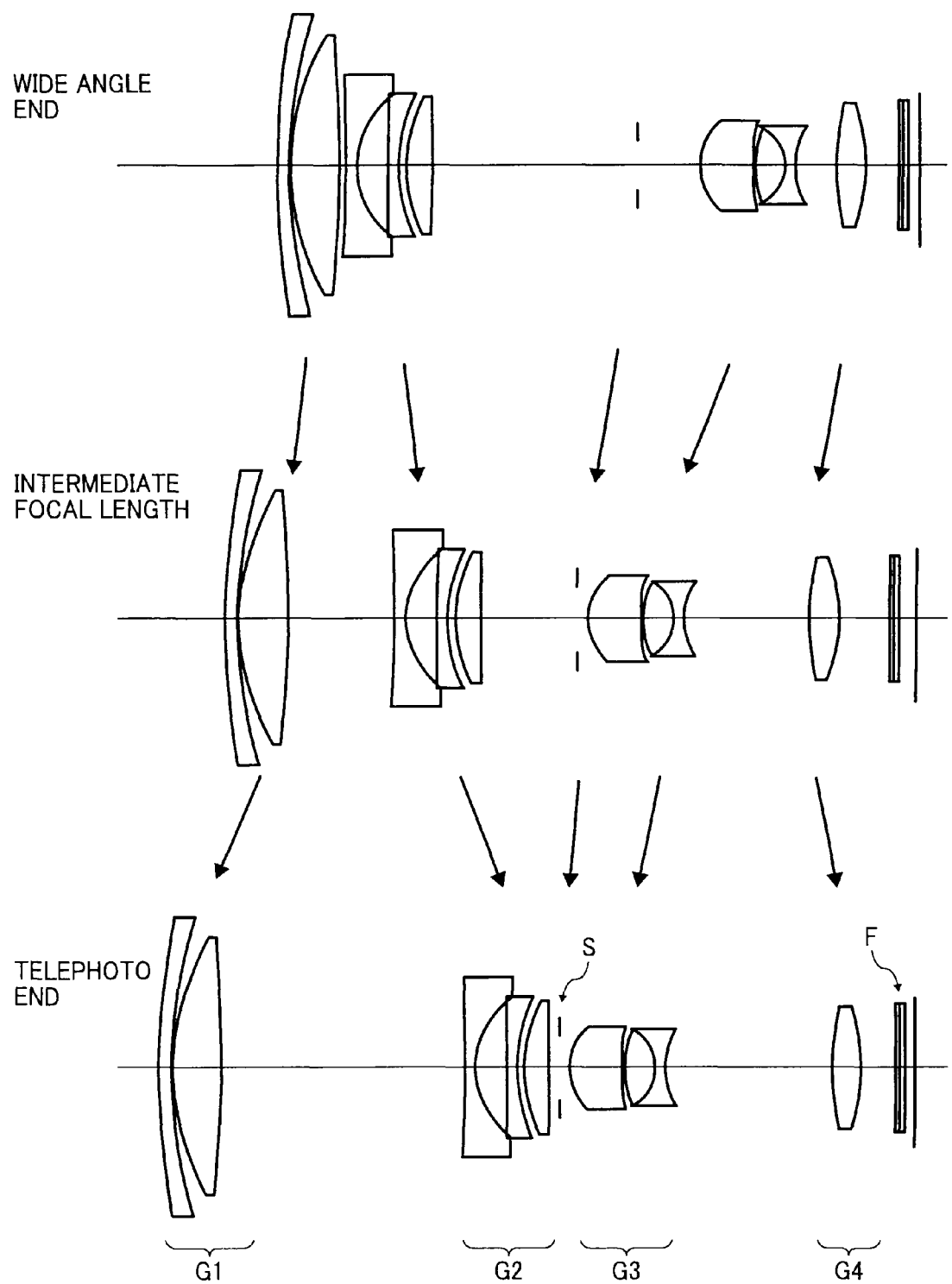
FIG. 33 is a view showing a lens configuration of the zoom lens according to Example 9.

Example 9 is a specific example of the zoom lens shown in FIG. 33.

| | | |
|---|---|---|
| Focal length | W: 5.05 | T: 52.01 |
| Half Angle of Field | W: 39.38 | T: 4.26 |
| Fno. | W: 3.67 | T: 5.79 |

Data of Example 9 is as follows.

| SURFACE NO. | R | D | Nd | vd | GLASS TYPE |
|---|---|---|---|---|---|
| 1 | 63.133 | 0.95 | 1.92286 | 18.9 | S-NPH2 |
| 2 | 37.761 | 0.1 | | | |
| 3* | 18.124 | 3.95 | 1.58913 | 61.15 | L-BAL35 |
| 4* | −88.62 | VARIABLE(A) | | | |
| 5* | −82.841 | 0.8 | 1.864 | 40.58 | L-LAH83 |
| 6* | 6.173 | 2.53 | | | |
| 7 | ∞ | 0.8 | 1.7331 | 48.89 | L-LAM72 |
| 8 | 12.171 | 0.61 | | | |
| 9 | 11.334 | 2.01 | 1.80809 | 22.76 | S-NPH1 |
| 10 | −689.212 | VARIABLE(B) | | | |
| 11 | APERTURE STOP | VARIABLE(C) | | | |
| 12* | 4.441 | 4.25 | 1.497 | 81.5 | K-PFK80 |
| 13* | −92.387 | 0.1 | | | |
| 14 | 7.704 | 2.42 | 1.6223 | 53.17 | S-BSM22 |
| 15 | −3.212 | 0.8 | 1.834 | 37.16 | S-LAH60 |
| 16 | 5.465 | VARIABLE(D) | | | |
| 17* | 24.219 | 2.33 | 1.51633 | 64.06 | L-BSL7 |
| 18 | −14.042 | 1 | | | |
| 19 | ∞ | 0.28 | 1.5377 | 66.6 | FILTER |
| 20 | ∞ | 0.5 | 1.5 | 64 | FILTER |

[Variable Amount]
Data on variable amounts of Example 9 is as follows.

| | Wide Angle End | Intermediate | Telephoto End |
|---|---|---|---|
| Variable(A) | 0.5 | 8.4112 | 19.4502 |
| Variable(B) | 16.5072 | 7.7342 | 0.8303 |
| Variable(C) | 5.0668 | 0.95 | 0.9197 |
| Variable(D) | 3.381 | 9.8796 | 13.3048 |

[Aspheric Surface]
Data on the aspheric surfaces of Example 9 is as follows.

| | K | A4 | A6 | A8 |
|---|---|---|---|---|
| 3rd | −0.21365 | −6.11068E−06 | −5.33907E−08 | 1.10490E−09 |
| 4th | 0 | 8.18554E−06 | 1.31400E−08 | −3.13919E−10 |
| 5th | 0 | 8.18113E−05 | 1.55717E−06 | −8.66465E−08 |
| 6th | −0.38023 | 0 | 2.86067E−06 | 4.59239E−07 |
| 12th | −0.00336 | −1.49472E−04 | 1.86823E−05 | −2.34903E−06 |
| 13th | −343.4611 | 1.37315E−03 | 6.97608E−05 | −2.79653E−06 |
| 17th | −2.73383 | −8.26919E−05 | 2.77844E−05 | −1.87611E−06 |

| | A10 | A12 | A14 |
|---|---|---|---|
| 3rd | −1.66325E−11 | 6.06793E−14 | 5.07107E−17 |
| 4th | −2.24157E−12 | 3.52013E−15 | 1.33810E−16 |
| 5th | 6.18775E−10 | 1.49390E−11 | −2.00535E−13 |
| 6th | −2.83993E−08 | 2.57871E−10 | 3.77490E−12 |
| 12th | 1.91551E−07 | −2.77789E−090 | |
| 13th | 8.06764E−07 | −9.61773E−090 | |
| 17th | 5.59135E−08 | −2.00526E−10 | −1.45775E−11 |

[Values of Parameters in Conditions]
Values of parameters in the conditions are as follows.

| Condition | Calculated Results |
|---|---|
| (11) | 0.41 |
| (12) | 7.01 |
| (13) | 0.0261 |
| (14) | 1.81 |
| (15) | 10.30 |

Figure 22:
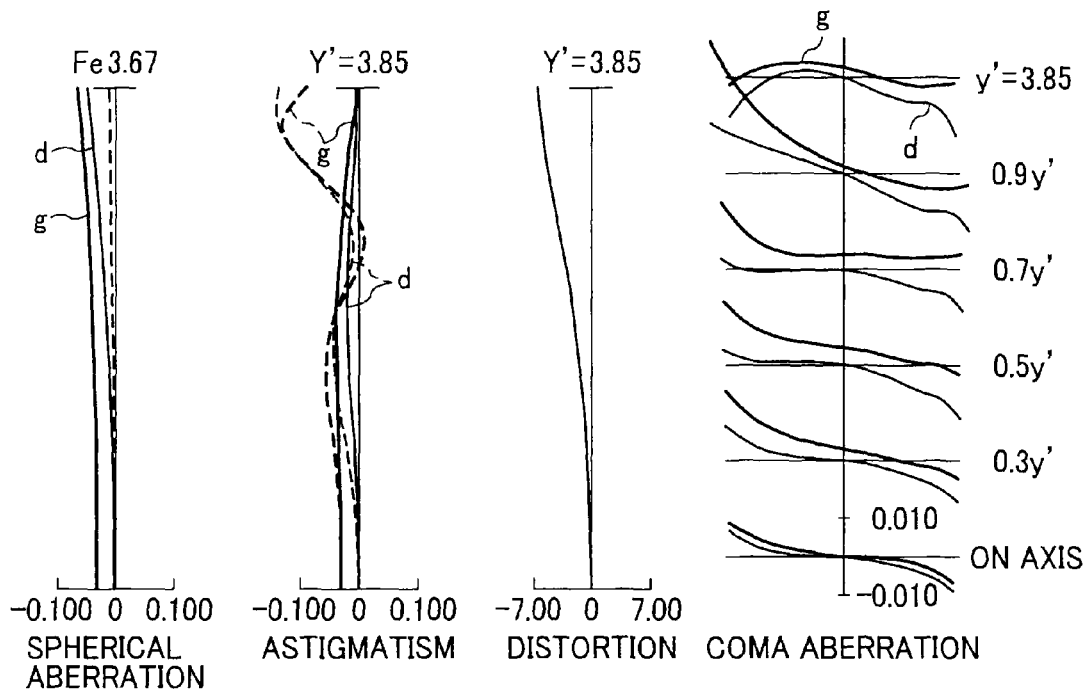
FIG. 22 is a view showing aberration curves in the zoom lens according to Example 6 at the wide angle end.
Figure 23:
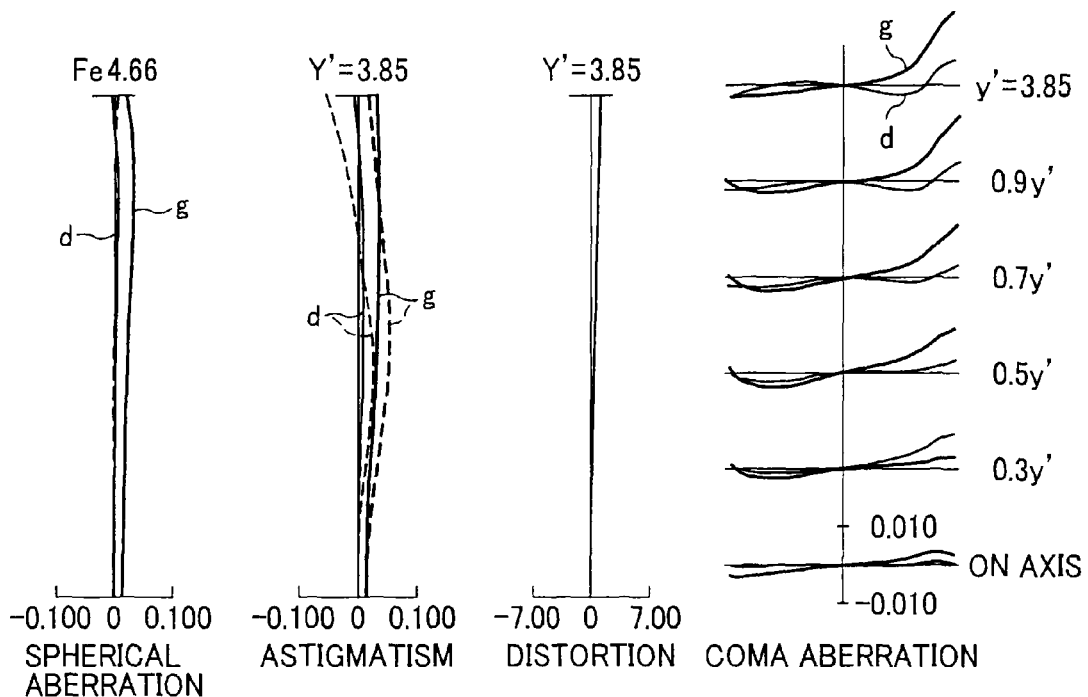
FIG. 23 is a view showing aberration curves in the zoom lens according to Example 6 at the intermediate focal length position.
Figure 24:
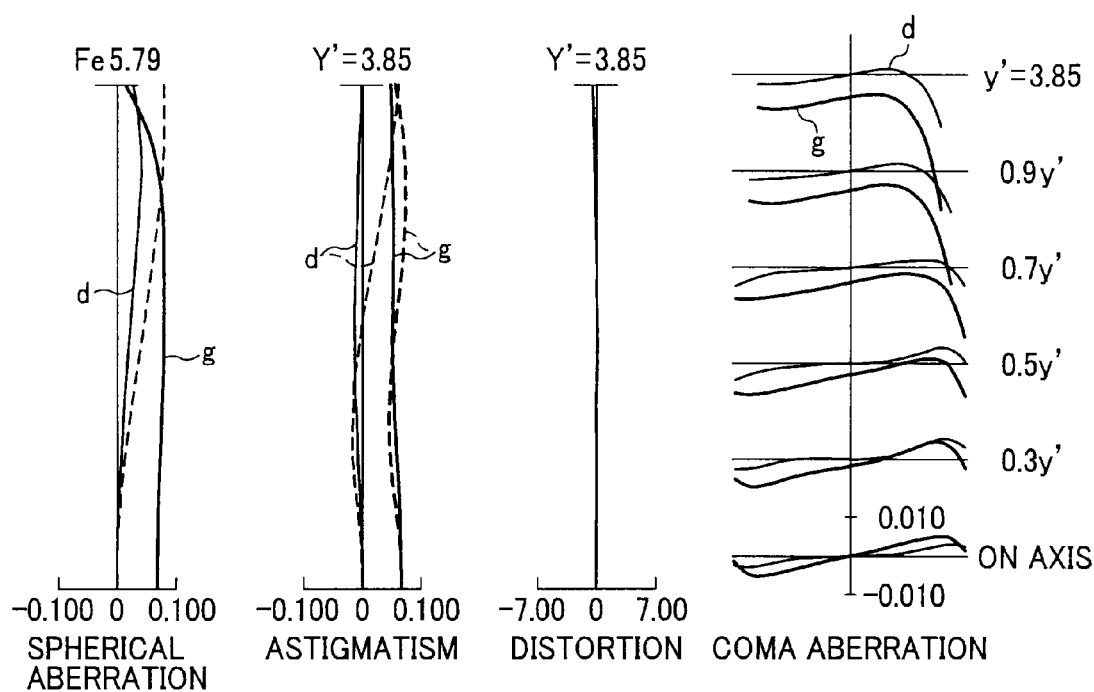
FIG. 24 is a view showing aberration curves in the zoom lens according to Example 6 at the telephoto end.

FIGS. 22, 23 and 24 are aberration curves at the wide angle end, the intermediate focal length position, and the telephoto end of the zoom lens according to Example 6, respectively.

Figure 26:
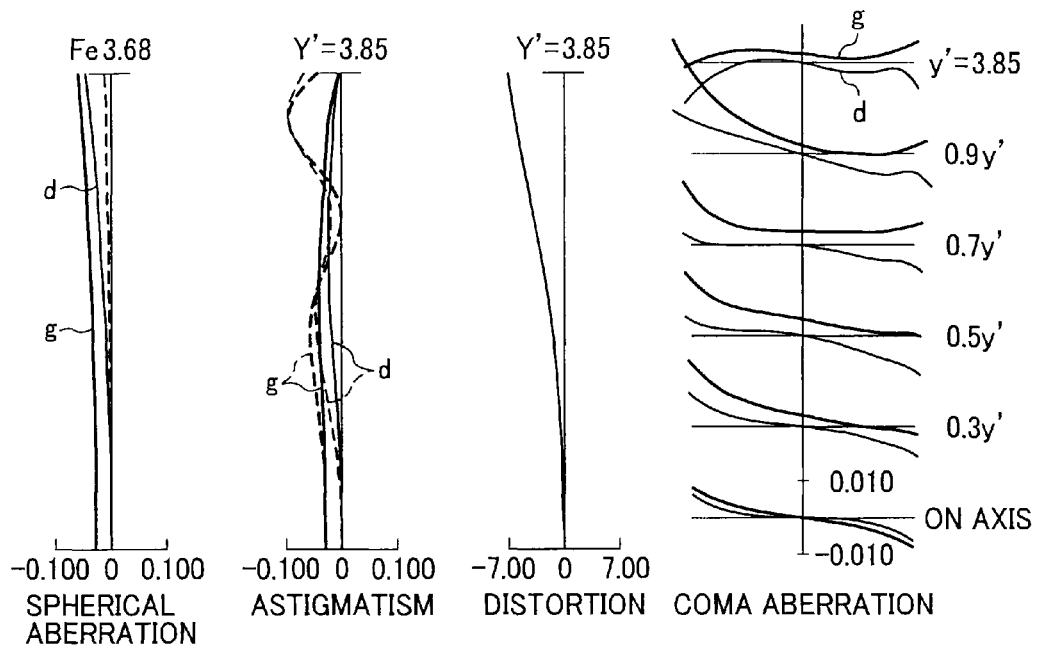
FIG. 26 is a view showing aberration curves in the zoom lens according to Example 7 at the wide angle end.
Figure 27:
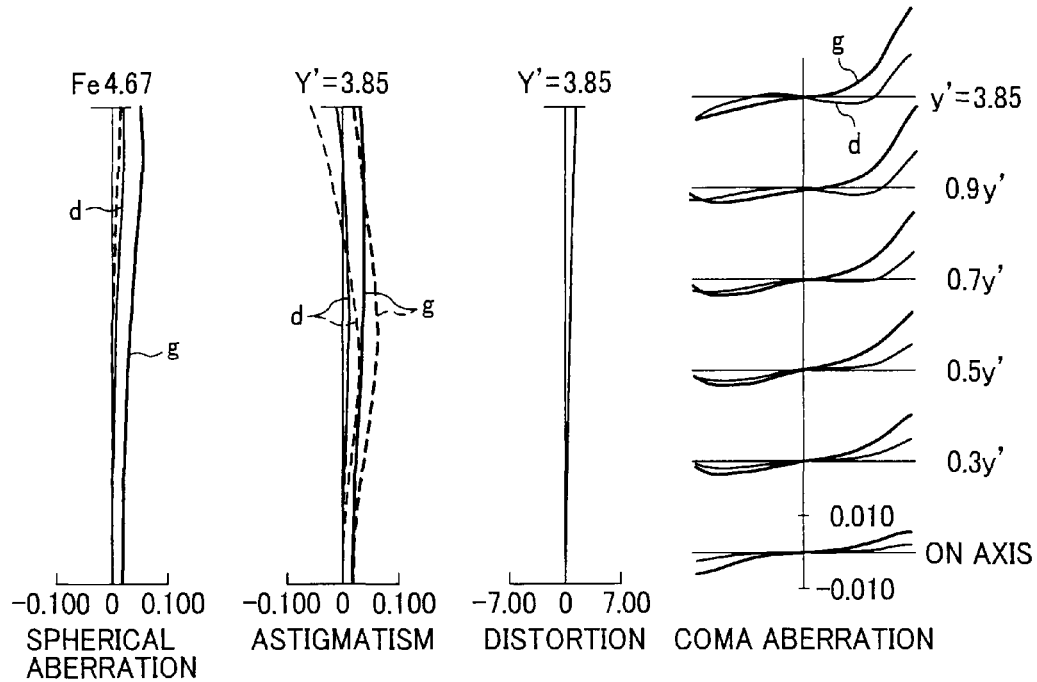
FIG. 27 is a view showing aberration curves in the zoom lens according to Example 7 at the intermediate focal length position.
Figure 28:
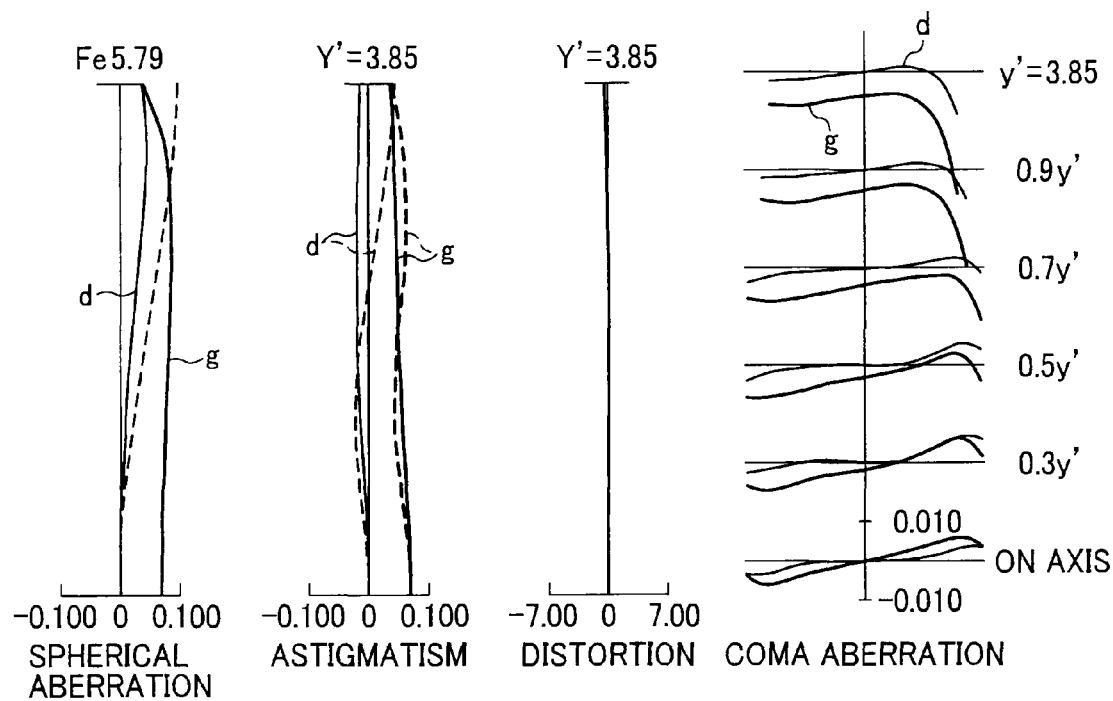
FIG. 28 is a view showing aberration curves in the zoom lens according to Example 7 at the telephoto end.

FIGS. 26, 27 and 28 are aberration curves at the wide angle end, the intermediate focal length position, and the telephoto end of the zoom lens according to Example 7, respectively.

Figure 30:
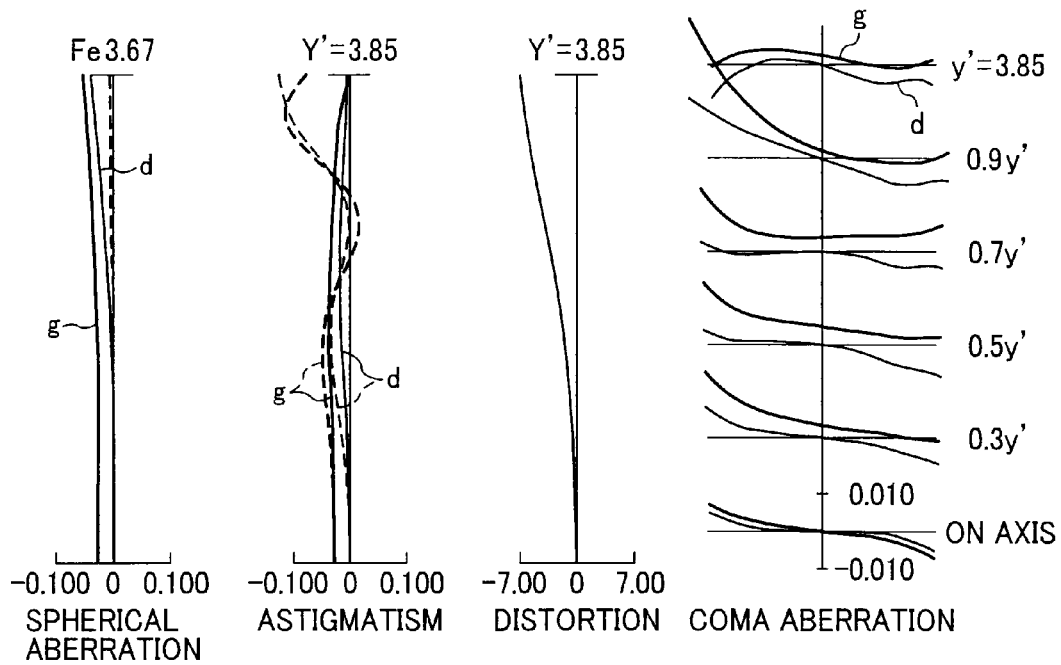
FIG. 30 is a view showing aberration curves in the zoom lens according to Example 8 at the wide angle end.
Figure 31:
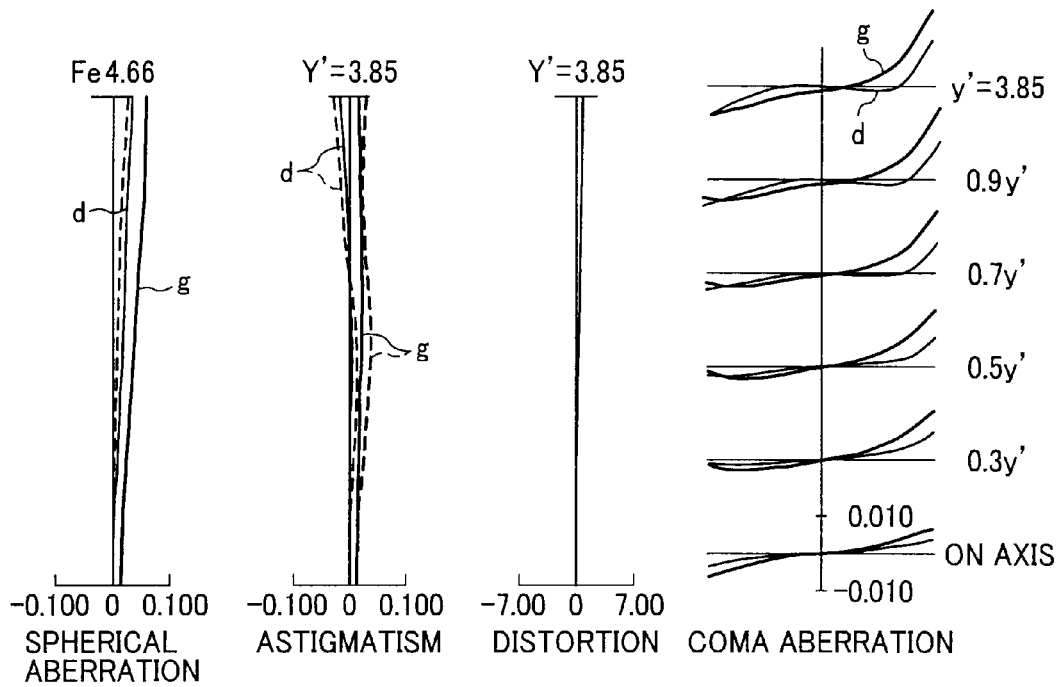
FIG. 31 is a view showing aberration curves in the zoom lens according to Example 8 at the intermediate focal length position.
Figure 32:
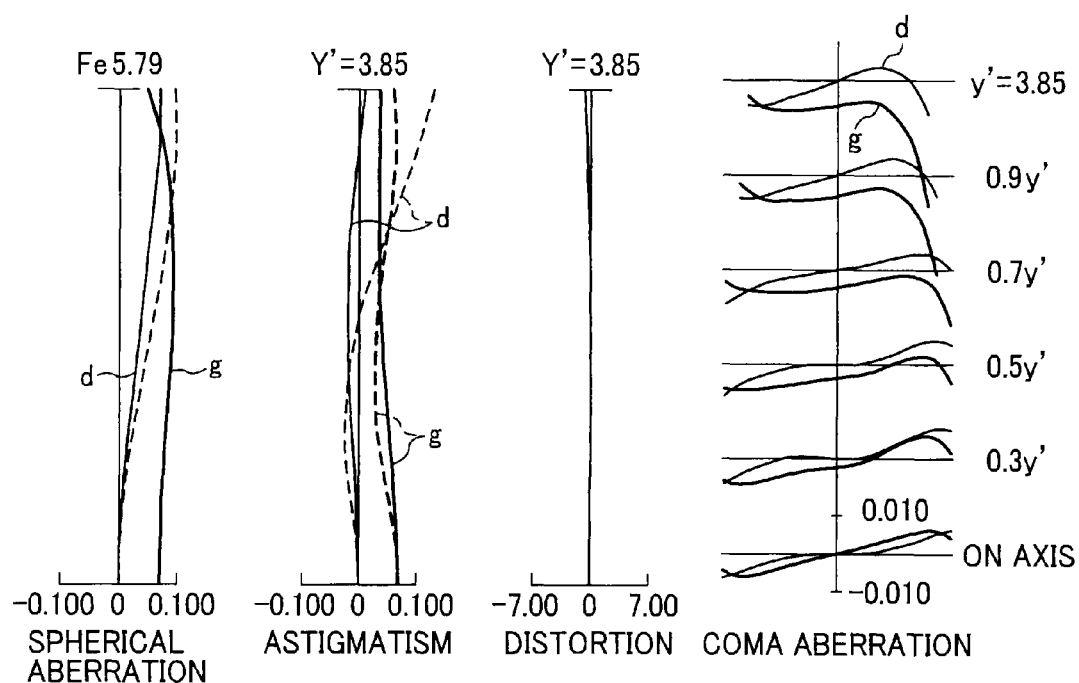
FIG. 32 is a view showing aberration curves in the zoom lens according to Example 8 at the telephoto end.

FIGS. 30, 31 and 32 are aberration curves at the wide angle end, the intermediate focal length position, and the telephoto end of the zoom lens according to Example 8, respectively.

Figure 34:
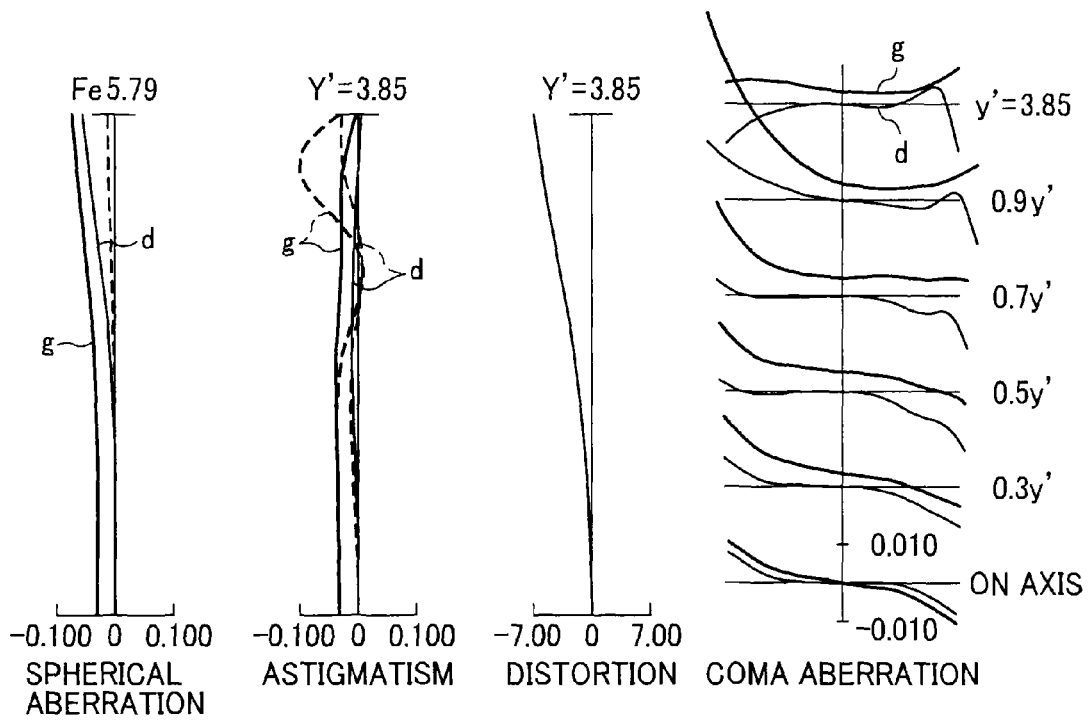
FIG. 34 is a view showing aberration curves in the zoom lens according to Example 9 at the wide angle end.
Figure 35:
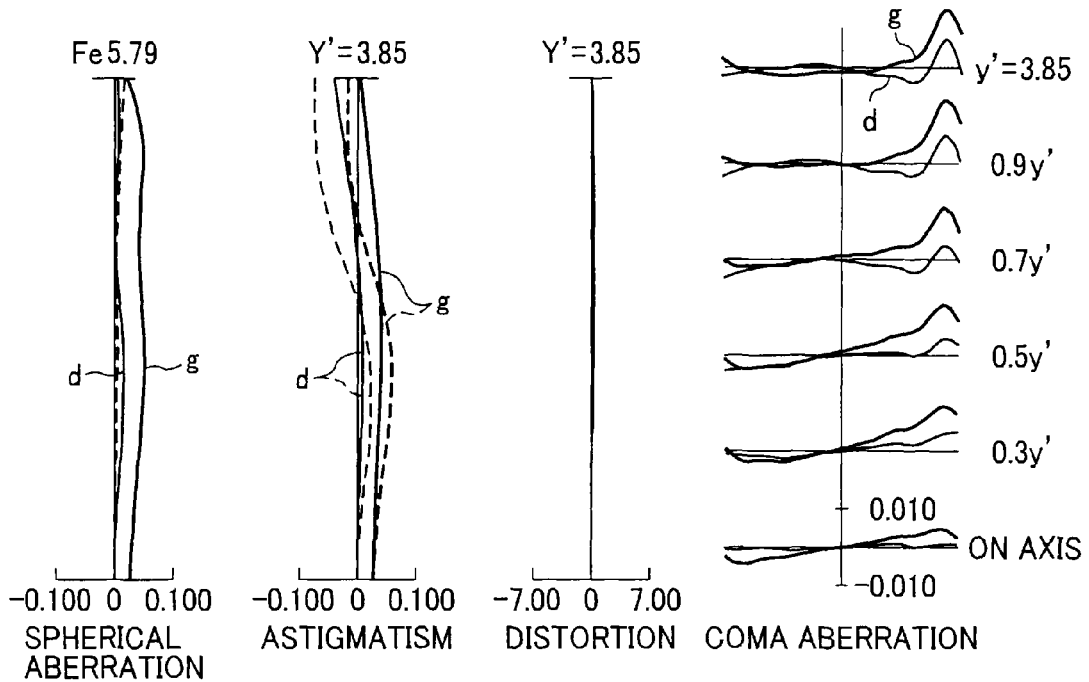
FIG. 35 is a view showing aberration curves in the zoom lens according to Example 9 at the intermediate focal length position.
Figure 36:
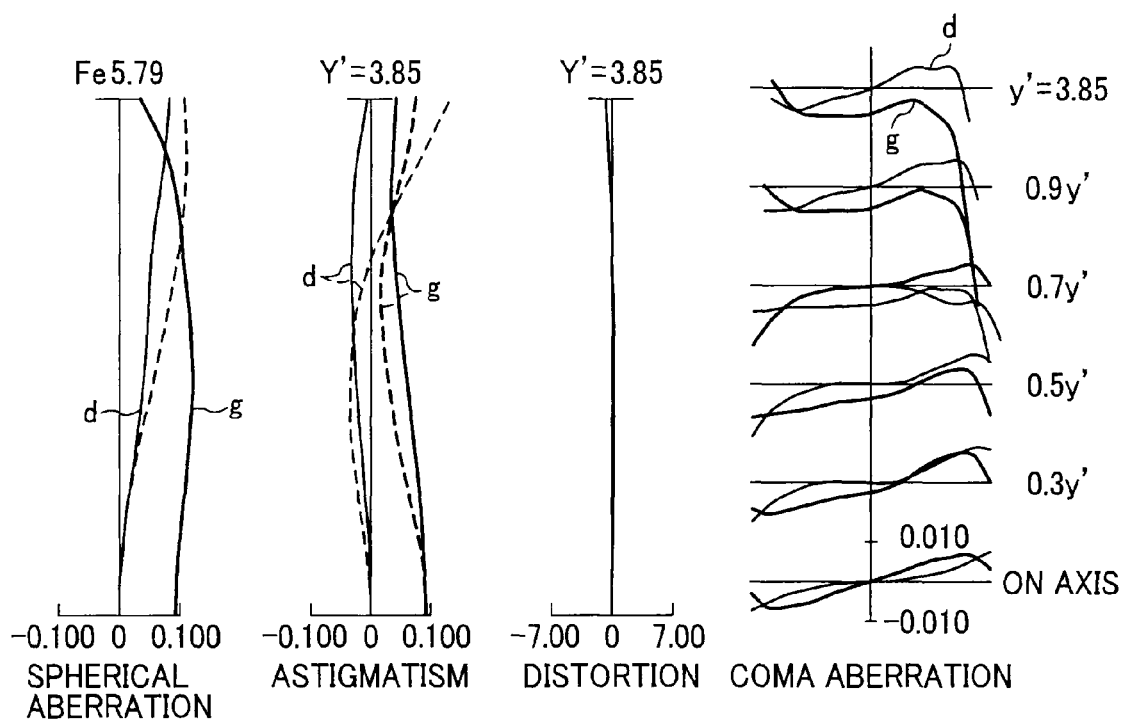
FIG. 36 is a view showing aberration curves in the zoom lens according to Example 9 at the telephoto end.

FIGS. 34, 35 and 36 are aberration curves at the wide angle end, the intermediate focal length position, and the telephoto end of the zoom lens according to Example 9, respectively.

As it can be found in the above aberration curves, in each Example, the half field angle at the wide angle end of 39 degrees or more, the magnification of more than 10 times, and a resolution corresponding to an image pickup device having at least 8 million pixels or more are achieved.

As described above, according to an embodiment of the present invention, a new zoom lens can be provided.

In the zoom lens, it is possible to successfully correct chromatic aberration and by satisfying each condition, as described in Examples, compact size, wide angle, that is, a half field angle of 39 degrees or more at the wide angle end, good performance, and a magnification ratio of 7 times or more can be achieved with 9 lenses configuration.

According to the second embodiment of the present invention, a new zoom lens and a new imaging apparatus can be provided. According to the invention of the second embodiment, as described in the specific Examples, small size, sufficient aberration correction, and a resolution corresponding to an image pickup device having at least 8 million pixels can be achieved. Accordingly, by using the zoom lens, small size and high performance imaging apparatus such as a digital camera can be achieved.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens comprising:
a first lens group having a positive refractive power, a second lens group having a negative refractive power, an aperture stop, a third lens group having a positive refractive power, and a fourth lens group having a positive refractive power, which are disposed in order from an object side, wherein
the first lens group consists of a negative lens and a positive lens having a convex surface at an object side, which are disposed in order from the object side;
the second lens group has, in order from the object side, a negative lens, a negative lens and a positive lens;
the positive lens of the first lens group has an aspheric surface;
an interval between the first lens group and the second lens group is increased and an interval between the second lens group and the third lens group is decreased when changing a magnification of the zoom lens from a wide angle end to a telephoto end;
the first lens group and the third lens group are moved from positions at the wide angle end toward positions, which are at object sides thereof, at the telephoto end, respectively;
the following conditions are satisfied:

$$1.52 < ndP < 1.62 \quad (1)$$

$$60.0 < vdP < 85.0 \quad (2)$$

where ndP is a refractive index of a material of the positive lens of the first lens group for a d line and vdP is a dispersion;
a partial dispersion ratio Pg, F is defined by the following formula:

$$Pg, F = (ng - nF)/(nF - nC)$$

where ng is a refractive index of a lens material for g line, nF is a refractive index of the lens material for F line, and nC is a refractive index of the lens material for C line;
Pg, FP is a partial dispersion ratio for a lens material of the positive lens of the first lens group and Pg, FN is a partial dispersion ratio for a lens material of the negative lens of the first lens group; and
the following condition is satisfied:

$$0.007 < \Delta Pg, FP < 0.050 \quad (3)$$

where $\Delta Pg, FP$ is defined by the following formula:

$$\Delta Pg, FP = Pg, FP - (-0.001802 \times vdP + 0.6483);$$

the following condition is satisfied:

$$|\Delta Pg, FP - \Delta Pg, FN| < 0.025 \quad (4)$$

where $\Delta Pg, FN$ is defined by the $$\Delta Pg, FN = Pg, FN - (-0.001802 \times vdN + 0.6483)$$

where vdN is a dispersion of material of the negative lens of the first lens group; and
wherein the following condition is satisfied:

$$4.0 < fap/fw < 8.0 \quad (5)$$

where fap is a focal length of the positive lens of the first lens group and fw is a focal length of the zoom lens at the wide angle end,
wherein the following condition is satisfied:

$$5.0 < f1/fw < 8.0 \quad (6)$$

where f1 is a focal length of the first lens group and fw is a focal length of the zoom lens at the wide angle end.

2. The zoom lens according to claim 1, wherein the following condition is satisfied:

$$0.50 < |f2|/f3 < 0.85 \quad (7)$$

where f2 is a focal length of the second lens group and f3 is a focal length of the third lens group.

3. The zoom lens according to claim 1, wherein the following condition is satisfied:

$$0.10 < X1/fT < 0.35 \quad (8)$$

where X1 is a total movement amount of the first lens group when changing the magnification of the zoom lens from the wide angle end to the telephoto end, and fT is a focal length of the zoom lens at the telephoto end.

4. The zoom lens according to claim 1, wherein the negative lens and the positive lens of the first lens group are cemented to each other.

5. A camera apparatus, comprising the zoom lens according to claim 1 as a photographing optical system.

6. A mobile information terminal apparatus, comprising a camera function device having the zoom lens according to claim 1 as a photographing apparatus.

7. A zoom lens comprising:
a first lens group having a positive refractive power, a second lens group having a negative refractive power, an aperture stop, a third lens group having a positive refractive power, and a fourth lens group having a positive refractive power, which are disposed in order from an object side, wherein
the first lens group consists of a negative lens and a positive lens having a convex surface at an object side, which are disposed in order from the object side;
the second lens group has, in order from the object side, a negative lens, a negative lens and a positive lens;
the positive lens of the first lens group has an aspheric surface;
an interval between the first lens group and the second lens group is increased and an interval between the second lens group and the third lens group is decreased when changing a magnification of the zoom lens from a wide angle end to a telephoto end;
the first lens group and the third lens group are moved from positions at the wide angle end toward positions, which are at object sides thereof, at the telephoto end, respectively;
the following conditions are satisfied:

$$1.52 < ndP < 1.62 \tag{1}$$

$$60.0 < vdP < 85.0 \tag{2}$$

where ndP is a refractive index of a material of the positive lens of the first lens group for a d line and vdP is a dispersion;
a partial dispersion ratio Pg, F is defined by the following formula:

$$Pg, F = (ng - nF)/(nF - nC)$$

where ng is a refractive index of a lens material for g line, nF is a refractive index of the lens material for F line, and nC is a refractive index of the lens material for C line;

Pg, FP is a partial dispersion ratio for a lens material of the positive lens of the first lens group and Pg, FN is a partial dispersion ratio for a lens material of the negative lens of the first lens group; and
the following condition is satisfied:

$$0.007 < \Delta Pg, FP < 0.050 \tag{3}$$

where $\Delta Pg, FP$ is defined by the following formula:

$$\Delta Pg, FP = Pg, FP - (-0.001802 \times vdP + 0.6483)$$

the following condition is satisfied:

$$|\Delta Pg, FP - \Delta Pg, FN| < 0.025 \tag{4}$$

where $\Delta Pg, FN$ is defined by the $$\Delta Pg, FN = Pg, FN - (-0.001802 \times vdN + 0.6483)$$

where vdN is a dispersion of material of the negative lens of the first lens group; and
wherein the following condition is satisfied:

$$4.0 < fap/fw < 8.0 \tag{5}$$

where fap is a focal length of the positive lens of the first lens group and fw is a focal length of the zoom lens at the wide angle end, and
wherein the following condition is satisfied:

$$0.10 < X3/fT < 0.30 \tag{9}$$

where X3 is a total movement amount of the third lens group when changing the magnification of the zoom lens from the wide angle end to the telephoto end, and fT is a focal length of the zoom lens at the telephoto end.

8. The zoom lens according to claim 1, wherein the third lens group has a most image side lens which is a negative lens having a largely concave surface at an image side; and
the following condition is satisfied:

$$0.5 < |r3R|/fw < 1.2 \tag{10}$$

where r3R is a curvature radius of the image side surface of the negative lens and fw is a focal length of the zoom lens at the wide angle end.

9. The zoom lens according to claim 7, wherein the following condition is satisfied:

$$0.50 < |f2|/f3 < 0.85 \tag{7}$$

where f2 is a focal length of the second lens group and f3 is a focal length of the third lens group.

10. A camera apparatus, comprising the zoom lens according to claim 7 as a photographing optical system.

* * * * *

UNITED STATES PATENT AND TRADEMARK OFFICE
CERTIFICATE OF CORRECTION

PATENT NO. : 8,873,161 B2  
APPLICATION NO. : 12/968993  
DATED : October 28, 2014  
INVENTOR(S) : Takahiro Nakayama Page 1 of 1

It is certified that error appears in the above-identified patent and that said Letters Patent is hereby corrected as shown below:

In the Claims

Column 38, line 11, change "1.52<ndP<1.6 2" to --1.52<ndP<1.62--;

Column 38, line 29, change "0.0 07<ΔPg" to --0.007<ΔPg--;

Column 39, line 32, change "1.52<ndP<1.6 2" to --1.52<ndP<1.62--; and

Column 40, line 7, change "where APg" to --where ΔPg--.

Signed and Sealed this
Third Day of March, 2015

Michelle K. Lee
*Deputy Director of the United States Patent and Trademark Office*